(12) United States Patent
Song et al.

(10) Patent No.: US 9,392,608 B2
(45) Date of Patent: Jul. 12, 2016

(54) RESOURCE PARTITIONING INFORMATION FOR ENHANCED INTERFERENCE COORDINATION

(75) Inventors: Osok Song, San Diego, CA (US); Aleksandar Damnjanovic, Del Mar, CA (US); Tingfang Ji, San Diego, CA (US); Taesang Yoo, San Diego, CA (US); Parag Arun Agashe, San Diego, CA (US); Madhavan Srinivasan Vajapeyam, San Diego, CA (US); Yongbin Wei, San Diego, CA (US); Tao Luo, San Diego, CA (US); Rajat Prakash, La Jolla, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 13/085,373

(22) Filed: Apr. 12, 2011

(65) Prior Publication Data

US 2011/0275394 A1 Nov. 10, 2011

Related U.S. Application Data

(60) Provisional application No. 61/323,756, filed on Apr. 13, 2010, provisional application No. 61/387,878, filed on Sep. 29, 2010, provisional application No. 61/387,886, filed on Sep. 29, 2010.

(51) Int. Cl.
*H04W 72/00* (2009.01)
*H04W 72/08* (2009.01)

(52) U.S. Cl.
CPC ............ *H04W 72/082* (2013.01); *H04W 72/08* (2013.01)

(58) Field of Classification Search
CPC . H04W 36/0061; H04W 16/10; H04W 72/04; H04L 72/04; H04L 5/0073; H04L 5/0023; H04L 5/0035

USPC .............................. 455/450, 451, 452.1, 443
See application file for complete search history.

(56) References Cited

U.S. PATENT DOCUMENTS

| 4,857,863 A | 8/1989 | Ganger et al. |
|---|---|---|
| 5,051,625 A | 9/1991 | Ikeda et al. |

(Continued)

FOREIGN PATENT DOCUMENTS

| CN | 1311968 A | 9/2001 |
|---|---|---|
| CN | 101018220 A | 8/2007 |

(Continued)

OTHER PUBLICATIONS

3GPP: "3rd Generation Partnership Project; Technical Specification Group Radio Access Network; Evolved Universal Terrestria Radio Access (E-UTRA); Physical l ayer procedures (Re1 ease 8)" 3GPP TS 36.213 V8.7.0 (May 2009) Technical Specification, No. V8.7.0, (Jun. 8, 2009), pp. 1-77, XP002602609.

(Continued)

*Primary Examiner* — Tu X Nguyen
(74) *Attorney, Agent, or Firm* — Nerrie M. Zohn

(57) ABSTRACT

Methods and apparatus for partitioning resources for enhanced inter-cell interference coordination (eICIC) are provided. Certain aspects involve broadcasting a message indicating time-domain resource partitioning information (RPI), where a user equipment (UE) may be operating in idle mode. With the RPI, the UE may be able to identify protected resources with reduced/eliminated interference from neighboring cells. The RPI in this broadcasted message may be encoded as a bitmap as an alternative or in addition to enumeration of the U/N/X subframes. Other aspects entail transmitting a dedicated or unicast message indicating the time-domain RPI, where a UE may be operating in connected mode. With the RPI, the UE may be able to determine channel state information (CSI), make radio resource management (RRM) measurements, or perform radio link monitoring (RLM), based on one or more signals from a serving base station during the protected time-domain resources.

74 Claims, 14 Drawing Sheets

(56) References Cited

U.S. PATENT DOCUMENTS

| | | |
|---|---|---|
| 5,587,678 A | 12/1996 | Dijkmans |
| 5,745,012 A | 4/1998 | Oka et al. |
| 5,748,019 A | 5/1998 | Wong et al. |
| 5,786,734 A | 7/1998 | Park |
| 5,949,259 A | 9/1999 | Garcia |
| 5,973,512 A | 10/1999 | Baker |
| 5,982,246 A | 11/1999 | Hofhine et al. |
| 6,040,744 A | 3/2000 | Sakurai et al. |
| 6,147,550 A | 11/2000 | Holloway |
| 6,151,492 A | 11/2000 | Melin |
| 6,167,240 A | 12/2000 | Carlsson et al. |
| 6,222,851 B1 | 4/2001 | Petry |
| 6,359,869 B1 | 3/2002 | Sonetaka |
| 6,504,830 B1 | 1/2003 | Ostberg et al. |
| 6,556,094 B2 | 4/2003 | Hasegawa et al. |
| 6,653,878 B2 | 11/2003 | Nolan |
| 6,677,799 B1 | 1/2004 | Brewer |
| 6,724,813 B1 | 4/2004 | Jamal et al. |
| 6,734,747 B1 | 5/2004 | Ishikawa et al. |
| 6,819,168 B1 | 11/2004 | Brewer |
| 6,819,195 B1 | 11/2004 | Blanchard et al. |
| 7,019,551 B1 | 3/2006 | Biesterfeldt |
| 7,129,798 B2 | 10/2006 | Aoyama et al. |
| 7,142,059 B2 | 11/2006 | Klein et al. |
| 7,420,395 B2 | 9/2008 | Kuramasu |
| 7,630,339 B2 | 12/2009 | Laroia et al. |
| 7,652,533 B2 | 1/2010 | Wang et al. |
| 7,710,212 B2 | 5/2010 | Seliverstov |
| 7,742,444 B2 | 6/2010 | Mese et al. |
| 7,786,779 B2 | 8/2010 | Chang et al. |
| 7,795,902 B1 | 9/2010 | Yella |
| 7,817,666 B2 | 10/2010 | Spinar et al. |
| 7,843,886 B2 | 11/2010 | Johnson et al. |
| 7,859,314 B2 | 12/2010 | Rutkowski et al. |
| 7,924,066 B2 | 4/2011 | Gagne et al. |
| 7,940,740 B2 * | 5/2011 | Krishnamurthy et al. .... 370/344 |
| 8,010,151 B2 | 8/2011 | Kim et al. |
| 8,058,928 B2 | 11/2011 | Terzioglu |
| 8,077,670 B2 | 12/2011 | Fan et al. |
| 8,085,875 B2 | 12/2011 | Gore et al. |
| 8,155,069 B2 | 4/2012 | Chun et al. |
| 8,174,995 B2 | 5/2012 | Malladi et al. |
| 8,228,827 B2 | 7/2012 | Jeong et al. |
| 8,363,697 B2 | 1/2013 | Grob et al. |
| 8,446,869 B2 * | 5/2013 | Lee et al. ............. 370/329 |
| 2003/0043928 A1 | 3/2003 | Ling et al. |
| 2005/0064873 A1 | 3/2005 | Karaoguz et al. |
| 2005/0096061 A1 | 5/2005 | Ji et al. |
| 2005/0254555 A1 | 11/2005 | Teague et al. |
| 2005/0260990 A1 | 11/2005 | Huang et al. |
| 2006/0098604 A1 | 5/2006 | Flammer |
| 2006/0166693 A1 * | 7/2006 | Jeong et al. ............. 455/525 |
| 2007/0064669 A1 | 3/2007 | Classon et al. |
| 2007/0087691 A1 | 4/2007 | Lee et al. |
| 2007/0104166 A1 | 5/2007 | Rahman et al. |
| 2007/0153719 A1 | 7/2007 | Gopal |
| 2007/0167181 A1 | 7/2007 | Ramesh et al. |
| 2007/0242763 A1 | 10/2007 | Li et al. |
| 2007/0253355 A1 | 11/2007 | Hande et al. |
| 2008/0008212 A1 | 1/2008 | Wang et al. |
| 2008/0013500 A1 | 1/2008 | Laroia et al. |
| 2008/0056193 A1 | 3/2008 | Bourlas et al. |
| 2008/0075032 A1 | 3/2008 | Balachandran et al. |
| 2008/0106297 A1 | 5/2008 | Jao |
| 2008/0130588 A1 | 6/2008 | Jeong et al. |
| 2008/0205322 A1 | 8/2008 | Cai et al. |
| 2008/0212514 A1 | 9/2008 | Chen |
| 2008/0219236 A1 | 9/2008 | Love et al. |
| 2008/0220791 A1 | 9/2008 | Cho et al. |
| 2008/0227449 A1 | 9/2008 | Gholmieh et al. |
| 2008/0253300 A1 | 10/2008 | Wakabayashi et al. |
| 2008/0254804 A1 | 10/2008 | Lohr et al. |
| 2008/0260000 A1 | 10/2008 | Periyalwar et al. |
| 2008/0260062 A1 | 10/2008 | Imamura |
| 2008/0268859 A1 | 10/2008 | Lee et al. |
| 2008/0285513 A1 | 11/2008 | Jung et al. |
| 2009/0034452 A1 | 2/2009 | Somasundaram et al. |
| 2009/0046605 A1 | 2/2009 | Gao et al. |
| 2009/0046674 A1 | 2/2009 | Gao et al. |
| 2009/0069023 A1 | 3/2009 | Ahn et al. |
| 2009/0088175 A1 | 4/2009 | Pelletier et al. |
| 2009/0103500 A1 | 4/2009 | Malkamaki et al. |
| 2009/0109915 A1 | 4/2009 | Pasad et al. |
| 2009/0131065 A1 | 5/2009 | Khandekar et al. |
| 2009/0135769 A1 | 5/2009 | Sambhwani et al. |
| 2009/0154458 A1 | 6/2009 | Kim et al. |
| 2009/0175214 A1 | 7/2009 | Sfar et al. |
| 2009/0196165 A1 | 8/2009 | Morimoto et al. |
| 2009/0196249 A1 | 8/2009 | Kawamura et al. |
| 2009/0196250 A1 | 8/2009 | Feng et al. |
| 2009/0197631 A1 | 8/2009 | Palanki et al. |
| 2009/0201880 A1 | 8/2009 | Aghili et al. |
| 2009/0213769 A1 | 8/2009 | Shen et al. |
| 2009/0238117 A1 | 9/2009 | Somasundaram et al. |
| 2009/0239590 A1 | 9/2009 | Parkvall |
| 2009/0252077 A1 | 10/2009 | Khandekar et al. |
| 2009/0257371 A1 | 10/2009 | Nishio |
| 2009/0257390 A1 | 10/2009 | Ji et al. |
| 2009/0264077 A1 | 10/2009 | Damnjanovic |
| 2009/0268684 A1 | 10/2009 | Lott et al. |
| 2009/0274086 A1 | 11/2009 | Petrovic et al. |
| 2009/0298498 A1 | 12/2009 | Pisut et al. |
| 2009/0312024 A1 | 12/2009 | Chen et al. |
| 2009/0325626 A1 | 12/2009 | Palanki et al. |
| 2010/0008282 A1 | 1/2010 | Bhattad et al. |
| 2010/0022250 A1 * | 1/2010 | Petrovic et al. .............. 455/450 |
| 2010/0029282 A1 | 2/2010 | Stamoulis et al. |
| 2010/0034135 A1 | 2/2010 | Kim et al. |
| 2010/0034158 A1 | 2/2010 | Meylan |
| 2010/0035600 A1 | 2/2010 | Hou et al. |
| 2010/0067472 A1 | 3/2010 | Ball et al. |
| 2010/0069076 A1 | 3/2010 | Ishii et al. |
| 2010/0080154 A1 | 4/2010 | Noh et al. |
| 2010/0091919 A1 | 4/2010 | Xu et al. |
| 2010/0110964 A1 | 5/2010 | Love et al. |
| 2010/0128690 A1 | 5/2010 | McBeath et al. |
| 2010/0144317 A1 | 6/2010 | Jung et al. |
| 2010/0195582 A1 | 8/2010 | Koskinen |
| 2010/0232373 A1 | 9/2010 | Nory et al. |
| 2010/0240386 A1 | 9/2010 | Hamabe et al. |
| 2010/0246521 A1 | 9/2010 | Zhang et al. |
| 2010/0254268 A1 | 10/2010 | Kim et al. |
| 2010/0254329 A1 | 10/2010 | Pan et al. |
| 2010/0254344 A1 | 10/2010 | Wei et al. |
| 2010/0260156 A1 | 10/2010 | Lee et al. |
| 2010/0265870 A1 | 10/2010 | Cai et al. |
| 2010/0272059 A1 * | 10/2010 | Bienas et al. ................ 370/330 |
| 2010/0290291 A1 | 11/2010 | Zhong et al. |
| 2010/0304665 A1 | 12/2010 | Higuchi |
| 2010/0309803 A1 | 12/2010 | Toh et al. |
| 2010/0309867 A1 | 12/2010 | Palanki et al. |
| 2010/0309876 A1 | 12/2010 | Khandekar et al. |
| 2010/0322180 A1 | 12/2010 | Kim et al. |
| 2010/0323611 A1 | 12/2010 | Choudhury |
| 2010/0331030 A1 | 12/2010 | Nory et al. |
| 2011/0007673 A1 | 1/2011 | Ahn et al. |
| 2011/0013554 A1 | 1/2011 | Koskinen |
| 2011/0032890 A1 | 2/2011 | Wu |
| 2011/0038271 A1 | 2/2011 | Shin et al. |
| 2011/0044227 A1 | 2/2011 | Harrang et al. |
| 2011/0044261 A1 | 2/2011 | Cai et al. |
| 2011/0051684 A1 | 3/2011 | Li et al. |
| 2011/0053603 A1 | 3/2011 | Luo et al. |
| 2011/0064037 A1 | 3/2011 | Wei et al. |
| 2011/0081865 A1 | 4/2011 | Xiao et al. |
| 2011/0116364 A1 | 5/2011 | Zhang et al. |
| 2011/0116437 A1 | 5/2011 | Chen et al. |
| 2011/0134875 A1 | 6/2011 | Ding et al. |
| 2011/0149771 A1 | 6/2011 | Abeta et al. |
| 2011/0149813 A1 | 6/2011 | Parkvall et al. |
| 2011/0170503 A1 | 7/2011 | Chun et al. |
| 2011/0182245 A1 | 7/2011 | Malkamaki et al. |
| 2011/0188481 A1 | 8/2011 | Damnjanovic et al. |
| 2011/0190024 A1 | 8/2011 | Seong et al. |

(56) References Cited

U.S. PATENT DOCUMENTS

| | | |
|---|---|---|
| 2011/0194514 A1 | 8/2011 | Lee et al. |
| 2011/0199986 A1 | 8/2011 | Fong et al. |
| 2011/0201279 A1 | 8/2011 | Suzuki et al. |
| 2011/0205982 A1 | 8/2011 | Yoo et al. |
| 2011/0211503 A1 | 9/2011 | Che et al. |
| 2011/0243075 A1 | 10/2011 | Luo et al. |
| 2011/0249643 A1 | 10/2011 | Barbieri et al. |
| 2011/0268032 A1 | 11/2011 | Kim et al. |
| 2011/0274066 A1 | 11/2011 | Tee et al. |
| 2011/0310789 A1 | 12/2011 | Hu et al. |
| 2011/0310830 A1 | 12/2011 | Wu et al. |
| 2011/0317624 A1 | 12/2011 | Luo et al. |
| 2012/0026892 A1 | 2/2012 | Nakao et al. |
| 2012/0033588 A1 | 2/2012 | Chung et al. |
| 2012/0033627 A1 | 2/2012 | Li et al. |
| 2012/0033647 A1 | 2/2012 | Moon et al. |
| 2012/0039180 A1 | 2/2012 | Kim et al. |
| 2012/0039208 A1 | 2/2012 | Aydin |
| 2012/0069795 A1 | 3/2012 | Chung et al. |
| 2012/0087250 A1 | 4/2012 | Song et al. |
| 2012/0088516 A1 | 4/2012 | Ji et al. |
| 2012/0093095 A1 | 4/2012 | Barbieri et al. |
| 2012/0093097 A1 | 4/2012 | Che et al. |
| 2012/0106481 A1 | 5/2012 | Cho et al. |
| 2012/0108239 A1 | 5/2012 | Damnjanovic et al. |
| 2012/0108255 A1 | 5/2012 | Jo et al. |
| 2012/0155366 A1 | 6/2012 | Zirwas et al. |
| 2012/0182958 A1 | 7/2012 | Pelletier et al. |
| 2012/0212260 A1 | 8/2012 | Chen et al. |
| 2012/0236798 A1 | 9/2012 | Raaf et al. |
| 2012/0281656 A1 | 11/2012 | Hooli et al. |
| 2013/0005344 A1 | 1/2013 | Dimou et al. |
| 2013/0033998 A1* | 2/2013 | Seo ................... H04W 24/00 370/252 |
| 2013/0077543 A1 | 3/2013 | Kim et al. |
| 2013/0077576 A1 | 3/2013 | Abe et al. |
| 2013/0229933 A1 | 9/2013 | Ji et al. |
| 2013/0250927 A1 | 9/2013 | Song |
| 2014/0036838 A1 | 2/2014 | Yoo et al. |
| 2014/0146798 A1 | 5/2014 | Damnjanovic et al. |

FOREIGN PATENT DOCUMENTS

| | | |
|---|---|---|
| CN | 101090281 A | 12/2007 |
| CN | 101155399 A | 4/2008 |
| CN | 101262680 A | 9/2008 |
| CN | 101316267 A | 12/2008 |
| CN | 101400130 A | 4/2009 |
| CN | 101483511 A | 7/2009 |
| CN | 101499882 A | 8/2009 |
| CN | 101505498 A | 8/2009 |
| CN | 101686580 A | 3/2010 |
| EP | 1811711 A1 | 7/2007 |
| EP | 2076066 | 7/2009 |
| JP | H06350514 A | 12/1994 |
| JP | 09501038 A | 1/1997 |
| JP | 09327060 A | 12/1997 |
| JP | H1118144 A | 1/1999 |
| JP | 2001231077 A | 8/2001 |
| JP | 2003506960 A | 2/2003 |
| JP | 2005277570 A | 10/2005 |
| JP | 2006345405 A | 12/2006 |
| JP | 2007529915 A | 10/2007 |
| JP | 2008017325 A | 1/2008 |
| JP | 2008500764 A | 1/2008 |
| JP | 2008500766 A | 1/2008 |
| JP | 2008172357 A | 7/2008 |
| JP | 2008301493 A | 12/2008 |
| JP | 2009527939 A | 7/2009 |
| JP | 2010506446 A | 2/2010 |
| JP | 2010081446 A | 4/2010 |
| JP | 2010516163 A | 5/2010 |
| JP | 2010519784 A | 6/2010 |
| JP | 2010536256 A | 11/2010 |
| JP | 2011505088 A | 2/2011 |
| JP | 2011505091 A | 2/2011 |
| JP | 2011507391 A | 3/2011 |
| JP | 2011516000 A | 5/2011 |
| JP | 2011521512 | 7/2011 |
| JP | 2012507177 A | 3/2012 |
| JP | 2013502841 A | 1/2013 |
| KR | 20100018453 A | 2/2010 |
| RU | 2305902 C2 | 9/2007 |
| RU | 2007105748 A | 8/2008 |
| RU | 2528379 C2 | 9/2014 |
| WO | 0111804 A1 | 2/2001 |
| WO | 2004066104 | 8/2004 |
| WO | 2004079949 A1 | 9/2004 |
| WO | WO-2005019705 A1 | 3/2005 |
| WO | WO-2005062798 A2 | 7/2005 |
| WO | 2005071867 | 8/2005 |
| WO | WO2005109705 | 11/2005 |
| WO | 2005125053 A1 | 12/2005 |
| WO | WO-2006020021 A1 | 2/2006 |
| WO | 2006099546 A1 | 9/2006 |
| WO | WO-2007080892 A1 | 7/2007 |
| WO | 2007097672 A1 | 8/2007 |
| WO | WO2007097671 A1 | 8/2007 |
| WO | WO2007108630 A1 | 9/2007 |
| WO | 2007129537 A1 | 11/2007 |
| WO | WO-2007129620 A1 | 11/2007 |
| WO | 2008024751 A2 | 2/2008 |
| WO | WO-2008040448 A1 | 4/2008 |
| WO | WO-2008041819 A2 | 4/2008 |
| WO | WO-2008081816 A1 | 7/2008 |
| WO | 2008093985 A1 | 8/2008 |
| WO | 2008116128 A2 | 9/2008 |
| WO | WO-2008127185 A1 | 10/2008 |
| WO | WO-2009011059 A1 | 1/2009 |
| WO | 2009020926 A1 | 2/2009 |
| WO | WO2009016260 A1 | 2/2009 |
| WO | WO2009022295 | 2/2009 |
| WO | WO2009038367 | 3/2009 |
| WO | 2009048246 A2 | 4/2009 |
| WO | WO-2009043002 | 4/2009 |
| WO | WO2009062115 | 5/2009 |
| WO | WO2009064147 A2 | 5/2009 |
| WO | 2009067842 A1 | 6/2009 |
| WO | 2009076803 A1 | 6/2009 |
| WO | WO-2009071583 A1 | 6/2009 |
| WO | WO2009078795 A1 | 6/2009 |
| WO | WO2009088251 A2 | 7/2009 |
| WO | WO-2009089798 A1 | 7/2009 |
| WO | WO-2009096846 A1 | 8/2009 |
| WO | WO-2009126586 A2 | 10/2009 |
| WO | WO-2009152866 A1 | 12/2009 |
| WO | WO-2010006285 A2 | 1/2010 |
| WO | 2010016607 A1 | 2/2010 |
| WO | WO2010016726 A2 | 2/2010 |
| WO | 2010032791 A1 | 3/2010 |
| WO | WO-2010033957 A2 | 3/2010 |
| WO | 2010044903 A2 | 4/2010 |
| WO | WO-2010036084 A2 | 4/2010 |
| WO | WO-2010039738 | 4/2010 |
| WO | WO-2010110840 A2 | 9/2010 |
| WO | WO2011034966 A1 | 3/2011 |
| WO | 2011130447 A1 | 10/2011 |
| WO | WO-2011130452 A2 | 10/2011 |

OTHER PUBLICATIONS

3GPP: "3rd Generation Partnership Project; Technical Specification Group Radio Access Network; Evolved Universal Terrestrial Radio Access (E-UTRA); Services provided by the physical layer (Release 8)", 3GPP Standard; 3GPP TS 36.302, 3rd Generation Partnership Project (3GPP), Mobile Competence Centre ; 650, Route Des Lucioles ; F-06921 Sophia-Antipolis Cedex ; France, No. V8.1.0, (Mar. 1, 2009), pp. 1-17, XP050377589.

3GPP: "3rd Generation Partnership Project;Technical Specification Group Radio Access Network;Further Advancements for E-UTRAPhysical Layer Aspects(Release 9)", 3GPP Draft; TR 36.814_110, 3rd Generation Partnership Project (3GPP), Mobile

(56) References Cited

OTHER PUBLICATIONS

Competence Centre ; 650, Route Des Lucioles ; F-06921 Sophia-Antipolis Cedex ; France, No. San Francisco, USA; May 9, 2009, pp. 1-34, XP050339706, [retrieved on May 9, 2009].
"3rd Generation Partnership Project; Technical Specification Group Radio Access Network; Evolved Universal Terrestrial Radio Access (E-UTRA) and Evolved Uni versa1 Terrestrial Radio Access Network (E-UTRAN); Overall description ; Stage 2 (Release 8)" 3GPP Standard; 3GPP TS 36.300, 3rd Generation Partnership Project (3GPP), Mobile Competence Centre ; 650, Route Des Lucioles ; F-06921 Sophia-Antipolis Cedex ; France, No. V8.8.0, Mar. 1, 2009, pp. 1-157, XP050377583.
Ericsson: 3GPP Draft; R3-083577, 3rd Generation Partnership Project (3GPP), Mobile Competence Centre ; 650, Route Des Lucioles ; F-06921 Sophia-Antipolis Cedex ; France, No. Prague, Czech Republic; Nov. 25, 2008, XP050324756 [retrieved on Nov. 25, 2008] Section 10.1.5.1.
Ericsson: "Simultaneous reception of transport channels in the LTE", 3GPP Draft; 36302_CR0009_(REL-8) R2-093578, 3rd Generation Partnership Project (3GPP), Mobile Competence Centre ; 650, Route Des Lucioles ; F-06921 Sophia-Antipolis Cedex ; France, No. San Francisco, USA; May 9, 2009, pp. 1-3, XP050340488, [retrieved on May 9, 2009].
Huawei: "R-PDCCH Design" 3GPP Draft; R1-093042 R-PDCCH Design, 3rd Generation Partnership Project (3GPP), Mobile Competence Centre ; 650, Route Des Lucioles ; F-06921 Sophia-Antipolis Cedex ; France, No. Shenzhen, China; Aug. 18, 2009, XP050351434 [retrieved on Aug. 18, 2009] p. 1, paragraph 1.
LG Electronics Inc: "MAC Random Access Response Extension" 3GPP Draft; R2-085237 MAC RAR Extension, 3rd Generation Partnership Project (3GPP), Mobile Competence Centre ; 650, Route Des Lucioles ; F-06921 Sophia-Antipolis Cedex ; France, No. Prague, Czech Republic; Sep. 23, 2008, XP050320136, [retrieved on Sep. 23, 2008] the whole document.
Potevio: "Considerations on the Resource Indication of R-PDCCH" 3GPP Draft; R1-093443 Considerations on the Resource Indication of R-PDCCH, 3rd Generation Partnership Project (3GPP), Mobile Competence Centre ; 650, Route Des Lucioles ; F-06921 Sophia-Antipolis Cedex ; France, No. Shenzhen, China; Aug. 18, 2009, XP050351718 [retrieved on Aug. 18, 2009] p. 1, paragraph 1-paragraph 2.
Samsung: "Clarification on the parallel receptions for PDSCHs", 3GPP Draft; 36302_CR0010 (REL-8) R2-093579, 3rd Generation Partnership Project (3GPP), Mobile Competence Centre ; 650, Route Des Lucioles ; F-06921 Sophia-Antipolis Cedex ; France, No. San Francisco, USA; May 19, 2009, pp. 1-2, XP050340489, [retrieved on May 19, 2009].
Samsung: "Downlink Subframe Alignment in Type I Relay" 3GPP Draft; R1-093386 Downlink Subframe Alignment in Type I Relay, 3rd Generation Partnership Project (3GPP), Mobile Competence Centre ; 650, Route Des Lucioles ; F-06921 Sophia-Antipolis Cedex ; France, No. Shenzhen, China; Aug. 19, 2009, XP050351683 [retrieved on Aug. 19, 2009] p. 1, paragraph 1.
Samsung: "Inbound mobility to H(e)NBs" 3GPP Draft; R2-093250_Inb0und Mobility to H(E)NBS-R4, 3rd Generation Partnership Project (3GPP), Mobile Competence Centre ; 650, Route Des Lucioles ; F-06921 Sophia-Antipolis Cedex ; France, No. San Francisco, USA; Apr. 28, 2009, XP050340933 [retrieved on Apr. 28, 2009] the whole document.
Vice Chairman: "Report of E-UTRA control plane session" 3GPP Draft; R2-082841-Chair-Report-RAN2-62-LTE-CP, 3rd Generation Partnership Project (3GPP), Mobile Competence Centre ; 650, Route Des Lucioles ; F-06921 Sophia-Antipolis Cedex ; France, vol. RAN WG2, No. Kansas City, USA; May 14, 2008, XP050140403 [retrieved on May 14, 2008].
Qualcomm Incorporated, "RRM/RLM Resource Restriction for Time Domain ICIC", 3GPP TSG-RAN WG2 Meeting #72-bis, R2-110698, Dublin, Ireland, Jan. 17-21, 2011.
Fujitsu, "An Efficient Reference Signal Design in LTE Advanced", 3GPP Draft; R1-090949, 3rd Generation Partnership Project (3GPP), Mobile Competence Centre, 650, Route Des Lucioles, F-06921 Sophia-Antipolis Cedex, France, No. Athens, Greece, Feb. 6, 2009, XP050318788.
Garcia F., et al.,"Design of a slew rate controlled output buffer", ASIC Conference 1998. Proceedings. Eleventh Annual IEEE International Rochester, NY, USA Sep. 13-16, 1998, New York, NY, USA.IEEE, US, Sep. 13, 1998, pp. 147-150, XP010309693, DOI: 10.1109/ASIC.1998.722821 ISBN: 978-0-7803-4980-3.
Huawei : "Enhanced ICIC for control channels to support Het.Net,", 3GPP TSG RAN WG1 meeting #61 R1-103126, May 14, 2010, pp. 1-8, XP002660456, Montreal , Canada Retrieved from the Internet : URL:http://ftp.3gpp.org/ftp/tsg-ran/WGI-RL1/TSGR1_61/Docs/ [retrieved on Sep. 30, 2011].
Huawei: "CQI Enhancement for Interference Varying Environments", 3GPP Draft; R1-101061 CQI Enhancement for Interference Varying Environments VER (Final), 3rd Generation Partnership Project (3GPP), Mobile Competence Centre ; 650, Route Des Lucioles ; F-06921 Sophia-Antipolis Cedex ; France, vol. RAN WGI, No. San Francisco, USA; Feb. 22, 2010, Feb. 16, 2010, XP050418632, [retrieved on Feb. 16, 2010].
Huawei: "Enhanced ICIC and Resource-Specific CQI Measurement", 3GPP Draft; R1-101981, 3rd Generation Partnership Project (3GPP), Mobile Competence Centre ; 650, Route Des Lucioles ; F-06921 Sophia-Antipolis Cedex ; France, vol. RAN WGI, No. Beijing, china; Apr. 12, 2010, Apr. 6, 2010, XP050419318, [retrieved on Apr. 6, 2010].
Inoue et al., "Space time transmit site diversity for OFDM multi base station system", 2002, pp, 30-34, IEEE 01045691.
International Search Report and Written Opinion-PCT/US2011/032370—ISA EPO—2011-08-09.
Panasonic: "PDCCH with cross component carrier assignment", 3GPP Draft; R1-093597(Update of R1-093464), 3rd Generation Partnership Project (3GPP), Mobile Competence Centre ; 650, Route Des Lucioles ; F-06921 Sophia-Antipolis Cedex ; France, No. Shenzhen, China; Aug. 24, 2009, XP050388168, [retrieved on Aug. 22, 2009].
Qualcomm Europe: "Carrier Aggregation in Heterogeneous Networks", 3GPP Draft; R1-092239, 3rd Generation Partnership Project (3GPP), Mobile Competence Centre; 650, Route Des Lucioles; F-06921 Sophia-Antipolis Cedex; France, No. San Francisco, USA; May 8, 2009, XP050339658, [retrieved on May 8, 2009].
Qualcomm Europe: "DL Carrier Aggregation Performance in Heterogeneous Networks", [online], 3GPP TSG-RAN WG1#58, R1-093145, URL: http://www.3gpp.org/ftp/tsg_ran/WG1_RL1/TSGR1_58/Docs/R1-093145.zip.
Qualcomm Incorporated: "Extending Rel-8/9 ICIC into Rel-10", 3GPP Draft; R1-101505 Extending Rel-8-9 ICIC Into Rel-10, 3rd Generation Partnership Project (3GPP), Mobile Competence Centre ; 650, Route Des Lucioles ; F-06921 Sophia-Antipolis Cedex ; France, vol. RAN WG1, No. San Francisco, USA; Feb. 22, 2010, Feb. 16, 2010, XP050418951, [retrieved on Feb. 16, 2010].
Huawei et al., "The possible restrictions on the configuration of almost blank subframes in Macro-Pico deployments", 3GPP Draft; R1-105150 the Possible Restrictions on the Configuration of Almost Blank Subframes in Macro-Pi Co Deployments_ Vo 5, 3rd Generation Partnership Project (3GPP), Mobile Competence Centre ; 650, Route Des Lucioles ; F-06921 Sophia-Antipolis CE, vol. RAN WG1, Oct. 5, 2010, XP050450368, pp. 1-5.
3GPP: "LS on RV Determination for BCCH," 3GPP TSG RAN WG1 Meeting #54bis, Sep. 29, 2008, R1-084067, <URL: http://www.3gpp.orgiftp/tsg_ran/WG1_RL1/TSGR1_54b/Docs/R1-084067.zip>.
3GPP TS 36.355 V9.0.0, Technical Specification Group Radio Access Network, E-UTRA, "LTE Positioning Protocal (LLP) (Release 9)" Dec. 2009, 31 pages.
3GPP TSG RAN WG2 #62bis, Ericsson, E-UTRA UE Radio Measurement Reporting for Uplink ICIC, R2-083147, Jul. 2008, http://www.3gpp.org/FTP/tsg_ran/WG2_RL2/TSGR2_62bis/Docs/R2-083147.zip.
3GPP TSG-RAN WG2 Meeting #68 R2-096531, "Email discussion on MBMS value range [67b#14]", Nov. 9-13, 2009, Jeju, Korea, Discussion and Decision, <URL: http://www.3gpp.orgiftp/tsg_ran/WG2_RL2/TSGR2_68/Docs/R2-096531.zip>, p. No. 1-13.

(56) References Cited

OTHER PUBLICATIONS

Alcatel-Lucent, "Interference Coordination Framework with Results", 3GPP TSG RAN WG1 Meeting #49bis, R1-07-3187, Jun. 29, 2007, pp. 1-9.
Catt,Addition of MBSFN information on X2 interface,[online],GPPTSG-RAN3 Meeting #64,May 4, 2009,R3-091247, Internet<URL:http://www.3gpp.org/ftp/tsg_ran/WG3_lu/TSGR3_64/Docs/R3-091247.zip>, p. No. 1-14.
Ericsson: Considerations on Non-CA based Heterogeneous Deployments, 3GPP TSG-RAN WG1 #61, R1-102618, ST-Ericsson, 2010, 3 Pages.
Gaie C., et al., "Distributed Discrete Resource Optimization in Heterogeneous Networks," IEEE, 2008, pp. 560-564.
Huawei, "Consideration on CSI-RS design for CoMP and text proposal to 36.814", 3GPP TSG-RAN WG1#57b R1-092364, Los Angeles, USA, Jun. 29-Jul. 3, 2009.
Interdigital Communications: "eICIC Macro-Femto: Time-domain muting and ABS", 3GPP TSG-RAN WG1#63, R1-105951, Nov. 15, 2010, 6 Pages, URL: http://www.3gpp.org/ftp/tsg_ran/WG1_RL1/TSGR1_63/Docs/R1-105951.zip.
LG Electronics: "Considerations on interference coordination in heterogeneous networks", 3GPP Draft ; R1-101369, 3rd Generation Partnership Project (3GPP), Mobile Competence Centre; 650, Route Des Lucioles ; F-06921 Sophia-Antipolis Cedex ; France, vol. RAN WGI, No. San Francisco, USA; 20100222-20100226, Feb. 16, 2010, XP050418854, pp. 1-5.
LG Electronics: Coordination for DL Control Channel in Co-Channel CSG Deployment, 3GPP TSG RAN WG1 Meeting #61, R1-102704, 2010, 8 Pages.
LG Electronics: "Coordination for DL control channel in co-channel HeNB deployment", 3GPP DRAFT; R1-102429 Control Channel in Hetnet, 3rd Generation Partnership Project (3GPP), Mobile Competence Centre ; 650, Route Des Lucioles ; F-06921 Sophia-Antipolis Cedex ; France, vol. RAN WG1, No. Beijing, china; Apr. 12, 2010, Apr. 6, 2010, XP050419640, [retrieved on Apr. 6, 2010].
LG-Nortel: "Interference under Type 1 RN", 3GPP TSG-RAN WG1#57, R1-092184, 14 pages, May 4, 2009.
Motorola: "DCI Format 1C with implicit RV and TBS," 3GPP TSG RAN1 #54, Aug. 18, 2008, R1-083207, 5 pages, <URL: http://www.3gpp.org/ftp/tsg_ran/WG1_RL1/TSGR1_54/Docs/R1-083207.zip>.
NTT DoCoMo: "Downlink Interference Coordination Between eNodeB and Home eNodeB", 36PP Draft; R1-101225 HENB_ICIC, 3rd Generation Partnership Project (3GPP), Mobile Competence Centre ; 650, Route Des Lucioles; F-06921 Sophia-Antipolis Cedex ; France, vol. RAN WGI, No. San Francisco, USA; Feb. 22, 2010, Feb. 16, 2010, XP050418740, [retrieved on Feb. 16, 2010]., p. 1-8.
NTT DoCoMo: "Interference Coordination for Non-CA-based Heterogeneous Networks", 3GPP Draft; R1-102307 ICIC for Non-CA Hetnet, 3rd Generation Partnership Project (3GPP), Mobile Competence Centre ; 650, Route Des Lucioles ; F-06921 Sophia-Antipolis Cedex ; France, vol. RAN WG1, No. Beijing, china; Apr. 12, 2010, Apr. 7, 2010, pp. 1-11, XP050419698, [retrieved on Apr. 7, 2010].
NTT DoCoMo, "Performance Evaluations of Heterogeneous Networks", 3GPP TSG RAN WG1 Meeting #60, R1-101226, Feb. 26, 2010, pp. 1-18.
Qualcomm Europe, "Carrier Aggregation in Heterogeneous Networks", 3GPP TSG RAN WG1 #56bis, R1-091459, pp. 1-12, Seoul, Korea, Mar. 23-27, 2009.
Qualcomm Europe: "Coordinated Multi-Point downlink transmission in LTE-Advanced" 3GPP Draft; R1-084400 Comp, 3rd Generation Partnership Project (3GPP), Mobile Competence Centre; 650, Route Des Lucioles ; F-06921 Sophia-Antipolis Cedex; France, No. Prague, Czech Republic; Nov. 5, 2008, XP050317663.
Texas Instruments: "Issues on Carrier Aggregation for Advanced E-UTRA", 3GPP Draft, R1-090280 TI Carrier AGGR, 3rd Generation Partnership Project (3GPP), Mobile Competence Centre, 650, Route Des Lucioles, F-06921 Sophia-Antipolis Cedex, France, No. Ljubljana, Jan. 7, 2009, XP050318205, pp. 1-5, [retrieved on Jan. 7, 2009].

3GPP TSG-RAN WG1 #58bis R1-094199, Specification impact of almost blank subframes, Qualcomm Europe, Oct. 12, 2009.
Lopez-Perez D., et al., "OFDMA femtocells: A roadmap on interference avoidance", IEEE Communications Magazine, IEEE Service Center, Piscataway, US, vol. 47, No. 9, Sep. 1, 2009, pp. 41-48, XP011283364, ISSN: 0163-6804, DOI: 10.1109/MCOM.2009.5277454.
Motorola: "HeNB Interference Management", 3GPP TSG-RAN WG1#60 R1-101121, <URL:http://www.3gpp.org/ftp/tsg_ran/WG1_RL1/TSGR1_60/Docs/R1-101121.zip>, Feb. 17, 2010, 4 Pages.
Nortel: "Discussions on LTE mobility performance evaluation", 3GPP TSG-RAN WG1#57 R1-091913, <URL:http://www.3gpp.org/ftp/tsg_ran/WG1_RL1/TSGR1_57/Docs/R1-091913.zip>, May 9, 2009, 3 Pages.
Qualcomm Europe: "Introduction of blank subframe indication into SIB2", 3GPP TSG-RAN WG2 #64, R2-086572, Nov. 14, 2008.
Qualcomm Incorporated: "Measurements and feedback extensions for improved operations in HetNets", 3GPP TSG-RAN WG1#60b R1-102353, <URL:http://www.3gpp.org/ftp/tsg_ran/WG1_RL1/TSGR1_60b/Docs/R1-102353.zip>, Apr. 6, 2010, 3 Pages.
TSG-RAN WG4: "Reply to LS on mobility evaluation" 3GPP TSG-RAN WG4#50bis R4-091518, <URL:http://www.3gpp.org/ftp/tsg_ran/WG4_Radio/TSGR4_50bis/Documents/R4-091518.zip>, Mar. 30, 2009, 3 Pages.
ZTE: "Scenarios and Specification Impact of Type 2 Relay", 3GPP TSG-RAN WG1#60 R1-100979, <URL: http://www.3gpp.org/ftp/tsg_ran/WG1_RL1/TSGR1_60/Docs/R1-100979.zip>, Feb. 16, 2010, 7 Pages.
3GPP TS 36.331 V8.5.0, Radio Resource Control (RRC); Protocol specification (Release 8), 204 pages, 2009.
Bell A L et al., "Multi-cell cooperative RS in CoMP", 3GPP Draft; R1-092317, 3rd Generation Partnership Project (3GPP), Mobile Competence Centre; 650, Route Des Lucioles; F-06921 Sophia-Antipolis Cedex; France, No. Los Angeles, USA; Jun. 24, 2009, XP050350848, [retrieved on Jun. 24, 2009].
Ericsson: "Structure of System Information", TSGR2#4(99)414, 5 pages, May 1999.
Fujitsu, "An Efficient Reference Signal Design in LTE Advanced", 3GPP Draft; R1-090949, 3rd Generation Partnership Project (3GPP), Mobile Competence Centre, 650, Route Des Lucioles, F06921 Sophia-Antopolis Cedex, France, No. Athens, Greece, Feb. 6, 2009, XP050318788.
Gale et al., "Distributed discreate resource optimization in Heterogeneous networks". 2008, pp. 560-564, IEEE 04641670.
Garcia F., et al.,"Design of a slew rate controlled output buffer", ASIC Conference 1998. Proceedings. Eleventh Annual IEEE International Rochester, NY, USA, Sep. 13-16, 1998, New York, NY, USA.IEEE, US, Sep. 13, 1998, pp. 147-150, XP010309693, DOI: 10.1109/ASIC.1998.722821 ISBN: 978-0-7803-4980-3.
Huawei: "Enhanced ICIC for control channels to support Het.Net,", 3GPP TSG RAN WG1 meeting #61 R1-103126, May 14, 2010, pp. 1-8, XP002660456, Montreal, Canada Retrieved from the Internet: URL:http://ftp.3gpp.org/ftp/tsg-ran/WGI-RL1/TSGR1_61/Docs/ [retrieved on Sep. 30, 2011].
Huawei: "CQI Enhancement for Interference Varying Environments", 3GPP Draft; R1-101061 CQI Enhancement for Interference Varying Environments Ver (Final), 3rd Generation Partnership Project (3GPP), Mobile Competence Centre; 650, Route des Lucioles; F-06921 Sophia-Antipolis Cedex; France, vol. RAN WGI, No. San Francisco, USA; 20100222, Feb. 16, 2010, XP050418632, [retrieved on Feb. 16, 2010].
Huawei: "Discussion on OTDOA based positioning issue", 3GPP Draft; R1-092355, 3rd Generation Partnership Project (3GPP), Mobile Competence Centre; 650, Route des Lucioles; F-06921 Sophia-Antipolis Cedex; France, No. Los Angeles, USA, Jun. 24, 2009, XP050350879, [retrieved on Jun. 24, 2009].
Huawei: "Enhanced ICIC and Resource-Specific CQI Measurement", 3GPP Draft; R1-101981, 3rd Generation Partnership Project (3GPP), Mobile Competence Centre; 650, Route des Lucioles; F-06921 Sophia-Antipolis Cedex; France, vol. RAN WGI, No. Beijing, China; Apr. 6, 2010, XP050419318, [retrieved on Apr. 6, 2010].

(56) References Cited

OTHER PUBLICATIONS

Inoue et al., "Space time transmit site diversity for OFDM multi base station system", 2002, pp. 30-34, IEEE 01045691.
International Search Report and Written Opinion—PCT/US2011/032370—ISA EPO—Aug. 9, 2011.
Panasonic: "PDCCH with cross component carrier assignment", 3GPP Draft; R1-093597(Update of R1-093464), 3rd Generation Partnership Project (3GPP), Mobile Competence Centre; 650, Route des Luciicles; F-06921 Sophia-Antipolis Cedex; France, No. Shenzhen, China; Aug. 24, 2009, XP050388168, [retrieved on Aug. 22, 2009].
Qualcomm Europe: "Carrier Aggregation in Heterogeneous Networks", 3GPP Draft; R1-092239, 3rd Generation Partnership Project (3GPP), Mobile Competence Centre; 650 Route des Luciicles; F-06921 Sophia-Antipolis Cedex; France, No. San Francisco, USA; May 8, 2009, XP050339658, [retrieved on May 8, 2009].
Qualcomm Europe: "DL Carrier Aggregation Performance in Heterogeneous Networks", [online], 3GPP TSG-RAN WG#58, R1-093145, URL: http://www.3gpp.org/ftp/tsg_ran/WG1_RL1/TSGR1_58/Docs/R1-093145.zip.
Qualcomm Incorporated: "Extending Rel-8/9 ICIC into Rel-10", 3GPP Draft; R1-101505 Extending Rel-8-9 ICIC Into Rel-10, 3rd Generation Partnership Project (3GPP), Mobile Competence Centre; 650, Route des Luciicles; F-06921 Sophia-Antipolis Cedex; France, vol. RAN WG1, No. San Francisco, USA; 20100222, Feb. 16, 2010, XP050418951, [retrieved on Feb. 16, 2010].
3GPP: "3rd Generation Partnership Project; Technical Specification Group Radio Access Network; Evolved Universal Terrestria Radio Access (E-UTRA); Physical 1 ayer procedures (Re1 ease 8)" 3GPP TS 36.213 V8.7.0 (May 2009) Technical Specification, No. V8.7.0, Jun. 8, 2009, pp. 1-77, XP002602609.
3GPP: "3rd Generation Partnership Project; Technical Specification Group Radio Access Network; Evolved Universal Terrestrial Radio Access (E-UTRA); Services provided by the physical layer (Release 8)", 3GPP Standard; 3GPP TS 36.302, 3rd Generation Partnership Project (3GPP), Mobile Competence Centre; 650, Route des Luciicles; F-06921 Sophia-Antipolis Cedex; France, No. V8.1.0, Mar. 1, 2009, pp. 1-17, XP050377589.
3GPP: "3rd Generation Partnership Project; Technical Specification Group Radio Access Network; Further Advancements for E-UTRA Physical Layer Aspects (Release 9)", 3GPP Draft; TR 36.814_110, 3rd Generation Partnership Project (3GPP), Mobile Competence Centre; 650, Route des Luciicles; F-06921 Sophia-Antipolis Cedex; France, no. San Francisco, USA; May 9, 2009, pp. 1-34, XP050339706, [retrieved on May 9, 2009].
3rd Generation Partnership Project: "3rd Generation Partnership Project; Technical Specification Group Radio Access Network; Evolved Universal Terrestrial Radio Access (E-UTRA) Medium Access Control (MAC) protocol specification (Release 8); 3GPP TS 36.321 V8.5.0" 3GPP TS 36.321 V8.5.0,, [Online] vol. 36.321, No. V8.5.0, Mar. 1, 2009, pp. 1-46, XP002555765 Internet Retrieved from the Internet: URL:http://www.3gpp.orq/ftp/Specs/html-inf 0/36321.htm> [retrieved on Oct. 21, 2009] Sections 5.1.1 to 5.1.6.
"3rd Generation Partnership Project; Technical Specification Group Radio Access Network; Evolved Universal Terrestrial Radio Access (E-UTRA) and Evolved Uni versal Terrestrial Radio Access Network (E-UTRAN); Overall description; Stage 2 (Release 8)" 3GPP Standard; 3GPP TS 36.300, 3rd Generation Partnership Project (3GPP), Mobile Competence Centre; 650, Route des Luciicles; F-06921 Sophia-Antipolis Cedex; France, No. V8.8.0, Mar. 1, 2009, pp. 1-157, XP050377583.
Ericsson: 3GPP Draft; R3-083577, 3rd Generation Partnership Project (3GPP), Mobile Competence Centre; 650, Route des Luciicles; F-06921 Sophia-Antipolis Cedex; France, No. Prague, Czech Republic; Nov. 25, 2008, XP050324756 [retrieved on Nov. 25, 2008] Section 10.1.5.1.
Ericsson: "Simultaneous reception of transport channels in the LTE", 3GPP Draft; 36302_CR0009_(REL-8) R2-093578, 3rd Generation Partnership Project (3GPP), Mobile Competence Centre; 650, Route des Luciicles; F-06921 Sophia-Antipolis Cedex; France, No. San Francisco, USA; May 9, 2009, pp. 1-3, XP050340488, [retrieved on May 9, 2009].
Huawei: "R-PDCCH Design" 3GPP Draft; R1-093042 R-PDCCH Design, 3rd Generation Partnership Project (3GPP), Mobile Competence Centre; 650, Route des Luciicles; F-06921 Sophia-Antipolis Cedex; France, No. Shenzhen, China; Aug. 18, 2009, XP050351434 [retrieved on Aug. 18, 2009] p. 1, paragraph 1.
Kulkarni P., et al.,"Radio Resource Management Considerations for LTE Femto Cells", ACM SIGCOMM Computer Communication Review, vol. 40, No. 1, Jan. 2010, pp. 26-30.
LG Electronics Inc: "MAC Random Access Response Extension" 3GPP Draft; R2-085237 MAC RAR Extension, 3rd Generation Partnership Project (3GPP), Mobile Competence Centre; 650, Route des Luciicles; F-06921 Sophia-Antipolis Cedex; France, No. Prague, Czech Republic; Sep. 23, 2008, XP050320136, [retrieved on Sep. 23, 2008] the whole document.
Potevio: "Considerations on the Resource Indication of R-PDCCH" 3GPP Draft; R1-093443 Considerations on the Resource Indication of R-PDCCH, 3rd Generation Partnership Project (3GPP), Mobile Competence Centre; 650, Route des Luciicles; F-06921 Sophia-Antipolis Cedex; France, No. Shenzhen, China; Aug. 18, 2009, XP050351718 [retrieved on Aug. 18, 2009] p. 1, paragraph 1-paragraph 2.
Samsung: "Clarification on the parallel receptions for PDSCHs", 3GPP Draft; 36302_CR0010 (REL-8) R2-093579, 3rd Generation Partnership Project (3GPP), Mobile Competence Centre; 650, Route des Luciicles; F-06921 Sophia-Antipolis Cedex; France, No. San Francisco, USA; May 19, 2009, pp. 1-2, XP050340489, [retrieved on May 19, 2009].
Samsung: "Downlink Subframe Alignment in Type I Relay" 3GPP Draft; R1-093386 Downlink Subframe Alignment in Type I Relay, 3rd Generation Partnership Project (3GPP), Mobile Competence Centre; 650, Route des Luciicles; F-06921 Sophia-Antipolis Cedex; France, No. Shenzhen, China; Aug. 19, 2009, XP050351683 [retrieved on Aug. 19, 2009] p. 1, paragraph 1.
Samsung: "Inbound mobility to H(e)NBs" 3GPP Draft; R2-093250_INB0UND Mobility to H(E)NBS-R4, 3rd Generation Partnership Project (3GPP), Mobile Competence Centre; 650, Route des Luciicles; F-06921 Sophia-Antipolis Cedex; France, No. San Francisco, USA; Apr. 28, 2009, XP050340933 [retrieved on Apr. 28, 2009] the whole document.
Vice Chairman: "Report of E-UTRA control plane session" 3GPP Draft; R2-082841-Chair-Report-RAN2-62-LTE-CP, 3rd Generation Partnership Project (3GPP), Mobile Competence Centre; 650, Route des Luciicles; F-06921 Sophia-Antipolis Cedex; France, vol. RAN WG2, No. Kansas City, USA; May 14, 2008, XP050140403 [retrieved on May 14, 2008].
Young Jin Sang et al: "A Self-Organized Femtocell for IEEE 802.16e System", Global Telecommunications Conference, 2009. Globecom 2009. IEEE, IEEE, Piscataway, NJ, USA, Nov. 30, 2009, pp. 1-5, XP031646102, ISBN: 978-1-4244-4148-8.
Qualcomm Incorporated, "RRM/RLM Resource Restriction for Time Domain ICIC", 3GPP TSG-RAN WG2 Meeting #72bis, R2-110698, Dublin, Ireland, Jan. 17-21, 2011.
Qualcomm Incorporated, "Introduction of Time Domain ICIC", 3GPP TSG-RAN WG2 Meeting #72, R2-106943, Jacksonville, US, Nov. 15-19, 2010.

* cited by examiner

Table 1 SRPI of Macro eNB

| Index | 0 | 1 | 2 | 3 | 4 | 5 | 6 | 7 |
|---|---|---|---|---|---|---|---|---|
| SRPI value | X | X | X | U | X | X | X | N |

Table 2 SRPI of Femto eNB

| Index | 0 | 1 | 2 | 3 | 4 | 5 | 6 | 7 |
|---|---|---|---|---|---|---|---|---|
| SRPI value | X | X | X | N | X | X | X | U |

FIG. 5

| 0 | 1 | 2 | 3 | 4 | 5 | 6 | 7 |
|---|---|---|---|---|---|---|---|
| 0 | 0 | 1 | 0 | 0 | 0 | 0 | 0 |

MACRO-FEMTO EXAMPLE:
BIT 2 indicates Subframe 2 as a "safe resource under strong interference from closed CSG"

FIG. 8A

| 0 | 1 | 2 | 3 | 4 | 5 | 6 | 7 |
|---|---|---|---|---|---|---|---|
| 0 | 0 | 1 | 0 | 0 | 0 | 0 | 0 |

MACRO-PICO with CRE EXAMPLE:
BIT 2 indicates Subframe 2 as a "safe resource under strong interference for Cell Range Expansion"

FIG. 8B

Two IE EXAMPLE

| 0 | 1 | 2 | 3 | 4 | 5 | 6 | 7 |
|---|---|---|---|---|---|---|---|
| 0 | 0 | 1 | 0 | 0 | 0 | 0 | 0 |

When transmitted by macro BIT 2 indicates Subframe 2 as "ABSF of aggressor"
(First IE may be used by non-member UE that cannot camp on femto cell)

| 0 | 1 | 2 | 3 | 4 | 5 | 6 | 7 |
|---|---|---|---|---|---|---|---|
| 0 | 0 | 1 | 0 | 0 | 0 | 0 | 0 |

When transmitted by femto BIT 2 indicates Subframe 2 as "ABSF of mine"
(Second IE may be used by non-member UE that cannot camp on femto cell)

FIG. 8C

RESOURCE PARTITIONING INFORMATION FOR ENHANCED INTERFERENCE COORDINATION

CROSS-REFERENCE TO RELATED APPLICATIONS

This application claims benefit of U.S. Provisional Patent Application Ser. No. 61/323,756, filed Apr. 13, 2010, U.S. Provisional Patent Application Ser. No. 61/387,886, filed Sep. 29, 2010, and U.S. Provisional Patent Application Ser. No. 61/387,878, filed Sep. 29, 2010, all of which are herein incorporated by reference.

BACKGROUND

I. Field

Certain aspects of the present disclosure generally relate to wireless communications and, more specifically, to partitioning resources for enhanced inter-cell interference coordination (eICIC).

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure generally relate to partitioning resources for enhanced inter-cell interference coordination (eICIC). Certain aspects involve broadcasting a message indicating time-domain resource partitioning information (RPI), where a user equipment (UE) may be operating in idle mode. With the RPI, the UE may be able to identify protected resources with reduced/eliminated interference from neighboring cells. The RPI in this broadcasted message may be encoded as a bitmap as an alternative or in addition to enumeration of the U/N/X subframes. Other aspects entail transmitting a dedicated or unicast message indicating the time-domain RPI, where a UE may be operating in connected mode. With the RPI, the UE may be able to determine channel state information (CSI), make radio resource management (RRM) measurements, or perform radio link monitoring (RLM), based on one or more signals from a serving base station during the protected time-domain resources.

In an aspect of the disclosure, a method for wireless communications is provided. The method generally includes obtaining a sequential frame number (SFN) and determining, based on the SFN, one or more protected subframes subject to cooperative resource allocation between a serving Node B and at least one non-serving Node B and unprotected subframes that are not subject to cooperative resource allocation.

In an aspect of the disclosure, an apparatus for wireless communications is provided. The apparatus generally includes means for obtaining a sequential frame number (SFN) and means for determining, based on the SFN, one or more protected subframes subject to cooperative resource allocation between a serving Node B and at least one non-serving Node B and unprotected subframes that are not subject to cooperative resource allocation.

In an aspect of the disclosure, a method for wireless communications is provided. The method generally includes receiving, at a user equipment (UE), an indication of time domain resource partitioning information (RPI) corresponding to time domain resource assignments between a serving access point and one or more non-serving access points in a heterogeneous network; and identifying one or more protected time domain resources based on the time domain RPI, the one or more protected time domain resources being time domain resources in which use by an interfering access point is limited.

In an aspect of the disclosure, a method for wireless communications is provided. The method generally includes participating in time domain resource partitioning in a heterogeneous network and transmitting an indication of time domain RPI identifying one or more protected time domain resources, the one or more protected time domain resources being time domain resources in which use by an interfering access point is limited.

In an aspect of the disclosure, an apparatus for wireless communications is provided. The apparatus generally includes means for receiving an indication of time domain RPI corresponding to time domain resource assignments between a serving access point and one or more non-serving access points in a heterogeneous network and means for identifying one or more protected time domain resources based on the time domain RPI, the one or more protected time domain resources being time domain resources in which use by an interfering access point is limited.

In an aspect of the disclosure, an apparatus for wireless communications is provided. The apparatus generally includes means for participating in time domain resource partitioning in a heterogeneous network and means for transmitting an indication of time domain RPI identifying one or more protected time domain resources, the one or more protected time domain resources being time domain resources in which use by an interfering access point is limited.

In an aspect of the disclosure, an apparatus for wireless communications is provided. The apparatus generally includes a receiver configured to receive an indication of time domain RPI corresponding to time domain resource assignments between a serving access point and one or more non-serving access points in a heterogeneous network and at least one processor configured to identify one or more protected time domain resources based on the time domain RPI, the one or more protected time domain resources being time domain resources in which use by an interfering access point is limited.

In an aspect of the disclosure, an apparatus for wireless communications is provided. The apparatus generally includes at least one processor configured to participate in time domain resource partitioning in a heterogeneous network and a transmitter. The transmitter is typically configured to transmit an indication of time domain RPI identifying one or more protected time domain resources, the one or more protected time domain resources being time domain resources in which use by an interfering access point is limited.

In an aspect of the disclosure, a computer-program product for wireless communications is provided. The computer-program product generally includes a computer-readable medium having code for receiving, at a UE, an indication of time domain RPI corresponding to time domain resource assignments between a serving access point and one or more non-serving access points in a heterogeneous network; and for identifying one or more protected time domain resources based on the time domain RPI, the one or more protected time domain resources being time domain resources in which use by an interfering access point is limited.

In an aspect of the disclosure, a computer-program product for wireless communications is provided. The computer-program product generally includes a computer-readable medium having code for participating in time domain resource partitioning in a heterogeneous network and for transmitting an indication of time domain RPI identifying one or more protected time domain resources, the one or more protected time domain resources being time domain resources in which use by an interfering access point is limited.

Various aspects and features of the disclosure are described in further detail below.

BRIEF DESCRIPTION OF THE DRAWINGS

FIG. 5 illustrates example resource partitioning in a heterogeneous network in accordance with certain aspects of the present disclosure.

FIGS. 8A-8C illustrate example structures for transmitting bitmap information conveying protected time domain resources in accordance with certain aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above, as well as other wireless networks and radio technologies. For clarity, certain aspects of the techniques are described below for LTE, and LTE terminology is used in much of the description below.

Example Wireless Network

Figure 1:
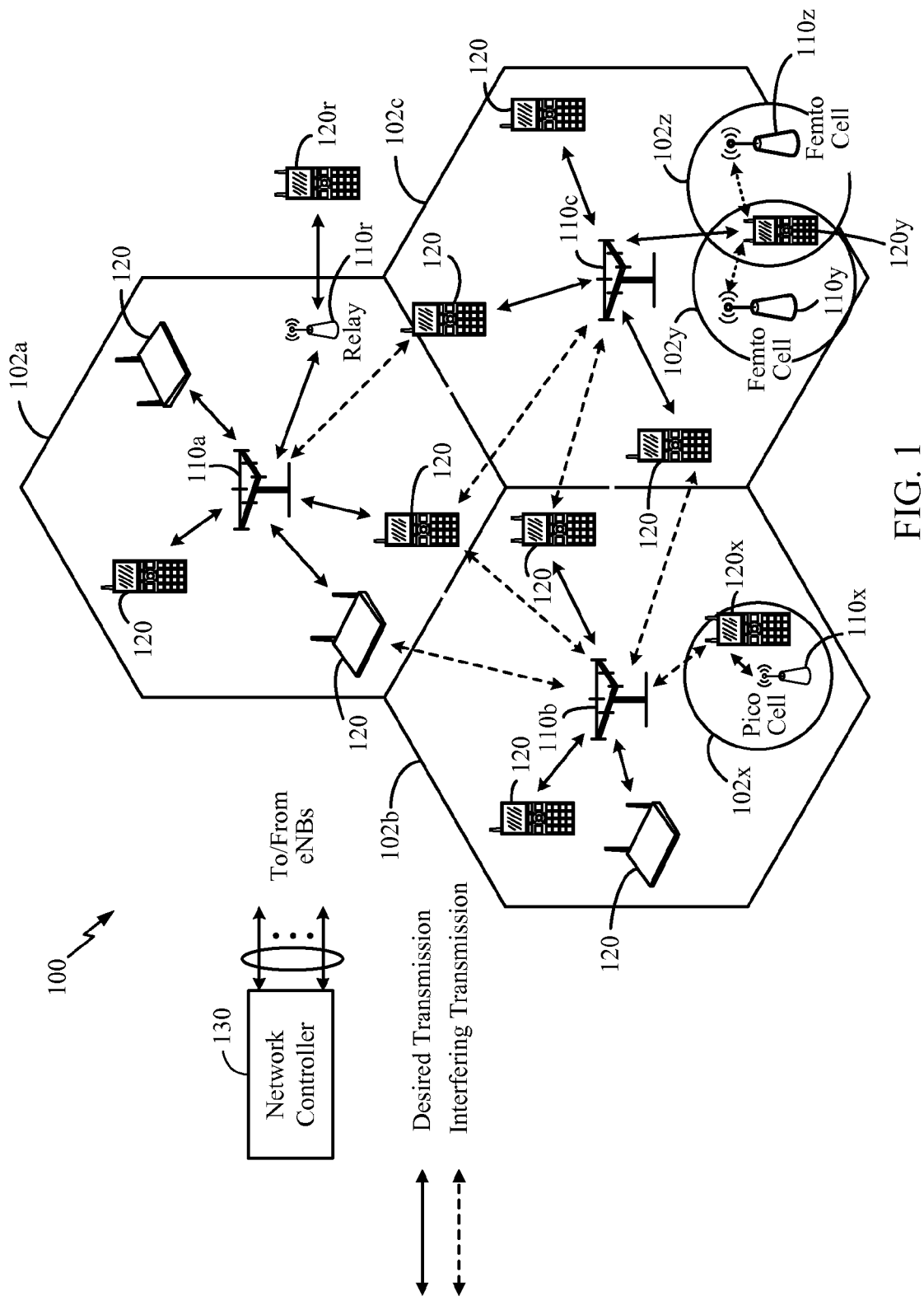
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. The term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. Network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
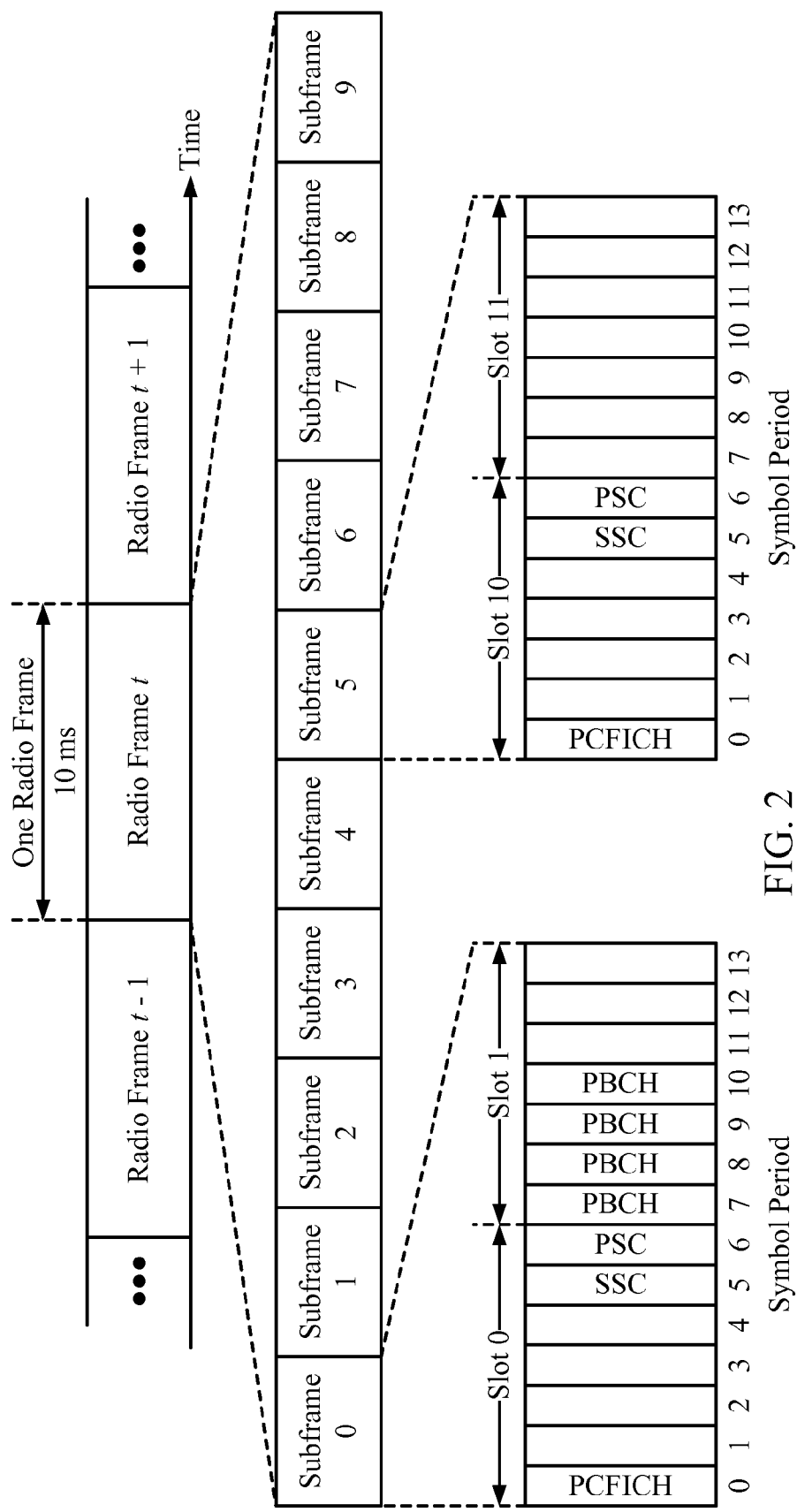
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
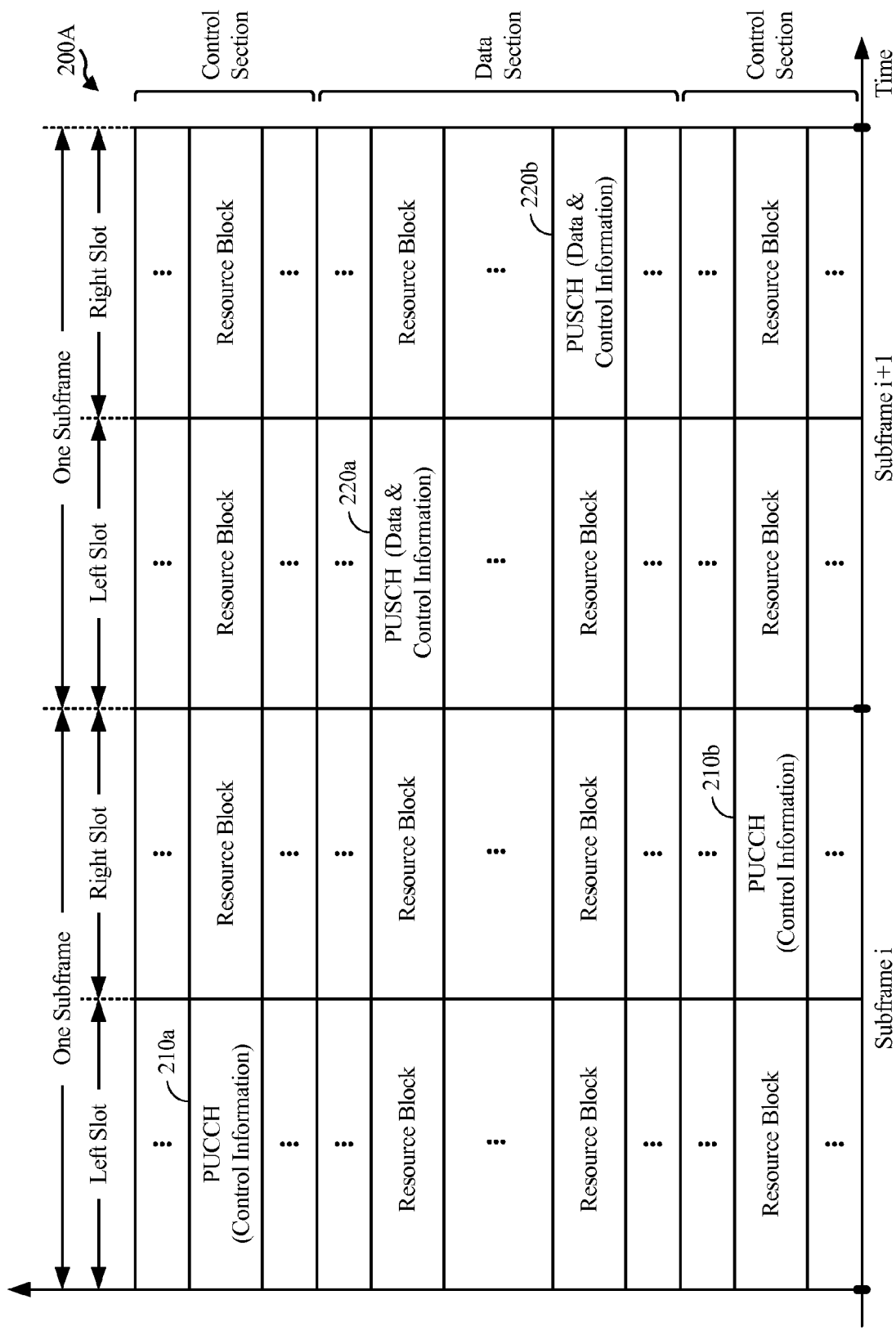
FIG. 2A is a block diagram conceptually illustrating an example of an uplink allocation of resources in accordance with certain aspects of the present disclosure.

FIG. 2A is a block diagram conceptually illustrating an example of an uplink allocation 200A of resources in accordance with certain aspects of the present disclosure, for example, corresponding to an uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210 on the assigned resource blocks in the control section. The UE may transmit data or both data and control information in a Physical Uplink Shared Channel (PUSCH) 220 on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the relative received power of signals from the eNB received at a UE (and not based on the transmit power level of the eNB).

Figure 3:
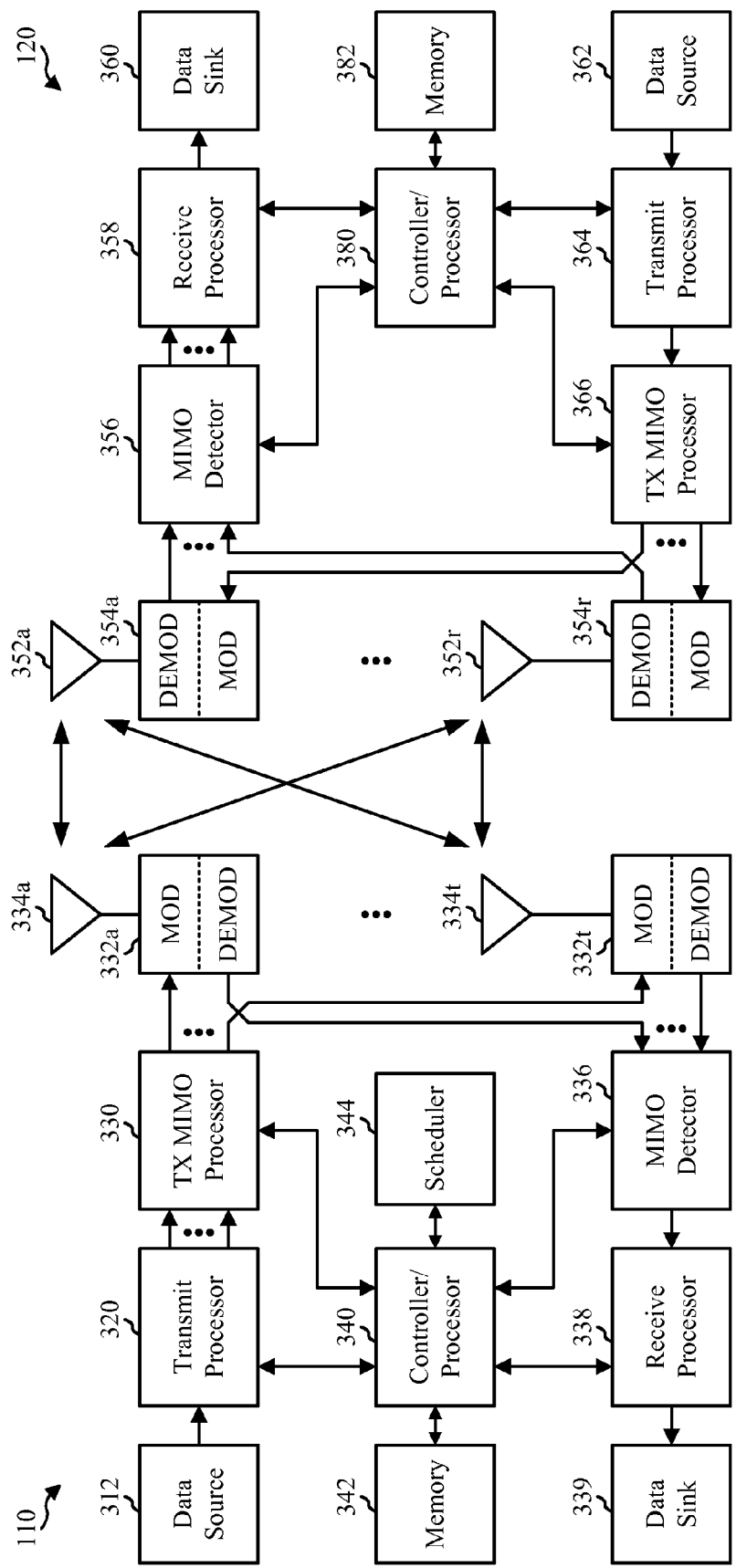
FIG. 3 is a block diagram conceptually illustrating an example of a Node B in communication with a user equipment (UE) in a wireless communications network in accordance with certain aspects of the present disclosure.

FIG. 3 shows a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from the modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340, 380 may direct the operation at the eNB 110 and the UE 120, respectively. The controller/processor 340 and/or other processors and modules at the eNB 110 may perform or direct operations for blocks 1000 in FIG. 10 and/or other processes for the techniques described herein. The controller/processor 380 and/or other processors and modules at the UE 120 may also perform or direct operations for blocks 700 in FIG. 7, operations for blocks 900 in FIG. 9, and/or other processes for the techniques described herein. The memories 342, 382 may store data and program codes for the eNB 110 and the UE 120, respectively. A scheduler 344 may schedule UEs for data transmission on the downlink and/or uplink.

Example Resource Partitioning

According to certain aspects of the present disclosure, when a network supports enhanced inter-cell interference coordination (eICIC), the base stations may negotiate with each other to coordinate resources in order to reduce/eliminate interference by the interfering cell's giving up part of its resources. Using eICIC or similar techniques, a UE can access the serving cell using the resources yielded by the interfering cell, where otherwise the UE would experience severe interference.

For example, a femto cell with a closed access mode (i.e., only a member femto UE can access the cell) in an open macro cell's coverage can create a coverage hole for a macro cell. By making a femto cell give up some of its resources, the macro UE under the femto cell coverage area can access the UE's serving macro cell by using the resources yielded by a femto cell.

In a radio access system using OFDM such as E-UTRAN, the resources yielded by the interfering cell may be time-based, frequency-based, or a combination of both. When the yielded resources are time-based, the interfering cell does not use some of the subframes in the time domain. When the yielded resources are frequency-based, the interfering cell does not use some of the subcarriers in the frequency domain. When the yielded resources are a combination of both frequency and time, the interfering cell does not use certain resources defined by frequency and time.

Figure 4:
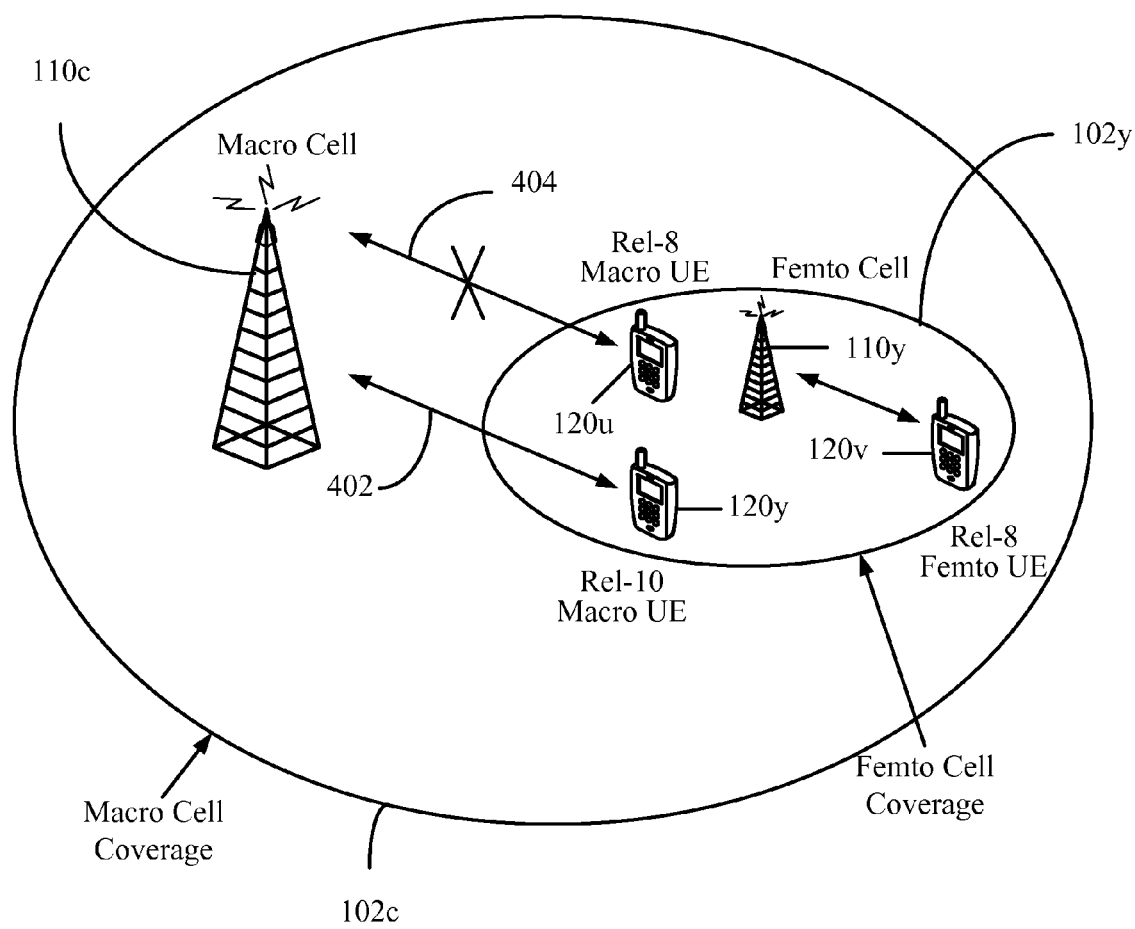
FIG. 4 illustrates an example heterogeneous network in accordance with certain aspects of the present disclosure.

FIG. 4 illustrates an example of the scenario where the eICIC may allow the macro UE 120y supporting eICIC (e.g., a Rel-10 macro UE as shown in FIG. 4) to access the macro cell 110c even when the macro UE 120y is under severe interference from the femto cell 110y, as illustrated by the solid radio link 402. A legacy macro UE 120u (e.g., a Rel-8 macro UE as shown in FIG. 4) may not be able to access the macro cell 110c under severe interference from the femto cell 110y, as illustrated by the broken radio link 404. A femto UE 120v (e.g., a Rel-8 femto UE as shown in FIG. 4) may access the femto cell 110y without any interference problems from the macro cell 110c.

According to certain aspects, the resource partitioning between base stations may be done time based. As an example, for E-UTRAN, resources may be partitioned by subframes.

According to certain aspects, networks may support enhanced interference coordination, where there may be different sets of partitioning information. A first of these sets may be referred to as Semi-static Resource Partitioning Information (SRPI). A second of these sets may be referred to as Adaptive Resource Partitioning Information (ARPI). As the name implies, SRPI does not change frequently, and SRPI may be sent to the UE so that the UE can use the resource partitioning information for the UE's own operations.

As an example, the resource partitioning may have 8 ms periodicity (8 subframes) or 40 ms (40 subframes) periodicity. For the downlink (e.g., from a cell node B to a UE), the partitioning pattern may be mapped to a known subframe (e.g., a first subframe of each radio frame that has a system frame number (SFN) value of multiples of 4). Thus, such a mapping may be applied in order to determine resource partitioning information for a specific subframe. An example for the downlink may be $$\text{Index}_{SRPI\_DL} = (SFN*10 + \text{subframe number}) \bmod 8$$

For the uplink, the SRPI mapping may be shifted, for example, by 4 ms. Thus, an example for the uplink may be $$\text{Index}_{SRPI\_UL} = (SFN*10 + \text{subframe number} + 4) \bmod 8$$

SRPI may use the following three values for each entry:
U (Use): this value indicates the subframe has been cleaned up from the dominant interference to be used by this cell (i.e., the main interfering cells do not use this subframe);
N (No Use): this value indicates the subframe shall not be used; and
X (Unknown): this value indicates the subframe is not statically partitioned. Details of resource usage negotiation between base stations are not known to the UE.

Another possible set of parameters for SRPI may be the following.
U (Use): this value indicates the subframe has been cleaned up from the dominant interference to be used by this cell (i.e., the main interfering cells do not use this subframe);
N (No Use): this value indicates the subframe shall not be used;
X (Unknown): this value indicates the subframe is not statically partitioned (and details of resource usage negotiation between base stations are not known to the UE); and
C (Common): this value may indicate all cells may use this subframe without resource partitioning. This subframe may be subject to interference, so that the base station may choose to use this subframe only for a UE that is not under severe interference.

SRPI of a serving cell may be broadcasted over the air. In E-UTRAN, the SRPI of the serving cell may be sent in a master information block (MIB), or one of the system information blocks (SIBs). A predefined SRPI may be defined based on the characteristics of cells, e.g., macro cell, pico cell (with open access), and femto cell (with closed access). In such a case, encoding of SRPI in the system overhead message may result in more efficient broadcasting over the air.

The base station may also broadcast the neighbor cell's SRPI in one of the SIBs. For this, SRPI may be sent with its corresponding range of physical cell identities (PCIs).

ARPI may represent further resource partitioning information with the detailed information for the 'X' subframes in SRPI. As noted above, detailed information for the 'X' subframes is typically known only to the base stations.

Figure 6:
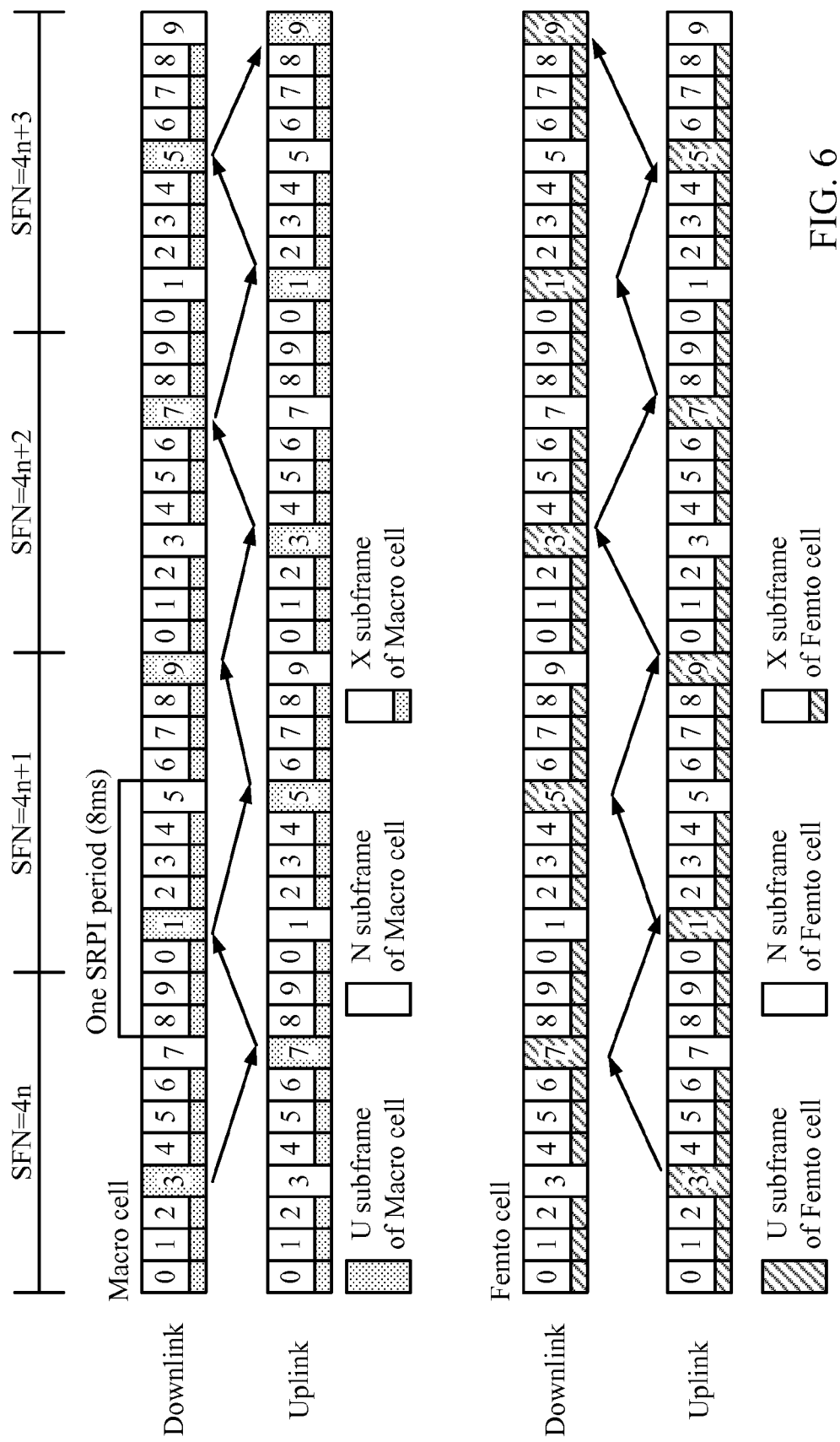
FIG. 6 illustrates example cooperative partitioning of subframes in a heterogeneous network in accordance with certain aspects of the present disclosure.

FIGS. 5 and 6 illustrate examples of SRPI assignment as described above in the scenario with macro and femto cells.

Example Broadcasting of Resource Partitioning Information

Figure 7:
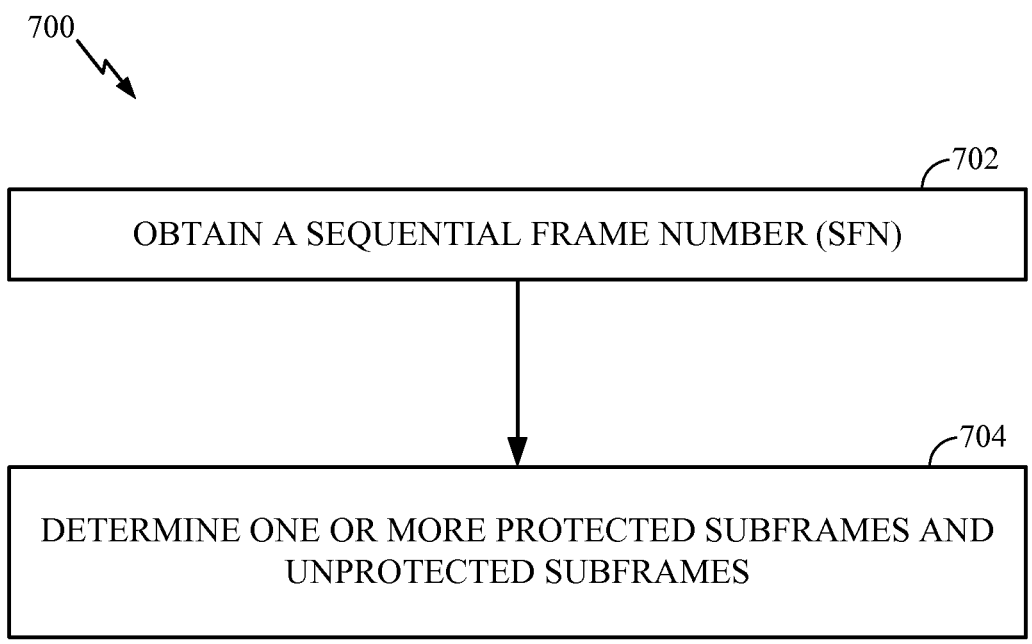
FIG. 7 is a functional block diagram conceptually illustrating example blocks executed to determine protected subframes subject to cooperative resource allocation, in accordance with the present disclosure.

FIG. 7 is a functional block diagram conceptually illustrating example blocks 700 executed to determine protected subframes subject to cooperative resource allocation, in accordance with the present disclosure. The blocks 700 may be performed, for example, by a UE or a Node B, to determine protected subframes based on a SFN. At 702, an SFN may be obtained. At block 704, one or more protected subframes subject to cooperative resource allocation between a serving Node B and at least one non-serving Node B may be determined based on the SFN. At block 704, one or more unprotected subframes that are not subject to cooperative resource allocation may also be determined.

Certain aspects of the present disclosure provide techniques for the use of SRPI for enhanced interference coordination. As used herein, the term "femto" may generally refer to a closed home enhanced Node B (HeNB) with a closed subscriber group (CSG) where a UE is not allowed to access (if the UE is not a member of the CSG). In a macro-femto scenario, the non-member UE (served by the macro cell) may be protected from the femto cell's interference and allowed to access the macro cell.

As used herein, the term "pico cell" generally refers to an open access eNB with smaller transmission power. Also as used herein, the term "CRE" generally refers to cell range expansion where a pico cell is used to expand the range of a macro cell. In the macro-pico scenario, it may be desirable to coordinate interference so that the pico can serve its UEs in an expanded geographic region, possibly with moderate handover (HO) bias.

According to certain aspects, resources may be restricted in the time domain. A protected resource, in some cases, may correspond to any resource where use by an interfering (or potentially interfering) cell is limited. For example, during protected subframes an interfering cell may be limited to required transmissions, such as an almost blank subframe (ABSF, also referred to as an ABS), which may be limited to reference signals, synchronization signals, and/or certain control signals. Resources in which use by an interfering (or potentially interfering) cell is not restricted may be considered as unprotected resources.

As noted above, when a network supports enhanced interference coordination, the base stations negotiate with each other to coordinate resources in order to reduce/eliminate interference by the interfering cell's giving up a portion of its time and/or frequency resources. As described above, FIG. 4 illustrates an example "macro-femto" scenario where eICIC may allow the macro UE 120y supporting eICIC (e.g., a Rel-10 macro UE in the figure) access to the macro cell, even when the macro UE 120y is under severe interference from the femto cell 110y.

Another scenario to consider is the "macro-pico" case with cell range expansion (CRE), where the UE is served by a weak pico cell. In this scenario, the macro cell may relinquish some time domain resources (e.g., subframes in E-UTRA) so that the UE can be served by the weak pico cell.

Throughout much of the description, resource partitioning between base stations may be time based (e.g., for E-UTRAN, the resource is partitioned by subframes). Those skilled in the art will appreciate, however, that the techniques presented herein may also be performed using coordinated partitioning of frequency resources or a combination of both time and frequency resources.

When a network supports enhanced interference coordination using time-domain resource partitioning, the network may broadcast the information about which time-domain resources the idle mode UE should use for mobility functions, such as cell selection and reselection. According to certain aspects, a statically negotiated or assigned almost blank subframe (ABSF) of the aggressor (i.e., the cell causing a strong interference) may be used by the UE, especially when the UE is under severe interference from the aggressor.

According to certain aspects, resource partitioning information (RPI), such as the ABSF of a femto, may be broadcast. According to certain aspects, this information may be encoded in an SIB or MIB as a bitmap. This bitmap may be broadcast as an alternative to or in addition to broadcasting the resource partitioning information as described above with reference to FIG. 5 (i.e., enumerated with U/N/X).

According to certain aspects, this information may be broadcast with an information element (IE). For example, as illustrated in FIG. 8A, in the macro-femto case, a new IE may be defined, for example, in SIB1/2. This IE may be considered as indicating a "safe resource under strong interference from closed CSG." The description of the related behavior and usage in this manner may be limited to the macro-femto case. In the illustrated example, bit 2 indicates an ABSF of the femto cell.

In the macro-pico case (with CRE) illustrated in FIG. 8B, an IE may be included in the broadcast, with a very similar or the same format as in the macro-femto case. In the macro-pico case, the IE may be considered as indicating a "safe resource under strong interference for cell range expansion." In the illustrated example, bit 2 indicates an ABSF of the pico cell. If an idle-mode UE camped on a macro cell does not try to detect a weak femto cell, but the UE once connected to a pico cell may remain in the pico extended boundary area (EBA) in idle mode, this may be broadcasted only by the pico cell (not by the macro cell).

Another possible approach, illustrated in FIG. 8C, is to define two different IEs (e.g., for macro SIB1/2, the IE may be defined as "ABSF of aggressor," while the IE in the femto SIB1/2 may be defined as "ABSF of mine"). This distinction may distinguish the former (macro SIB1/2), intended for use by a UE camping on the macro cell, from the latter (femto SIB1/2), intended for use only for the non-member UE who cannot camp on the cell.

As presented herein, various signaling of resource partitioning may be performed in a heterogeneous network that may benefit a UE in idle mode in performing utility functions. As described above, bitmap information (e.g., ABSF of an aggressor cell) may be broadcast (e.g., instead of or in place of the enumerated based SRPI illustrated in FIG. 5). As illustrated in FIGS. 8A-8C, this may be common information between two associated cells (i.e., the same information is broadcasted in both femto and macro-femto scenarios).

A UE may use this bitmap information only in specific conditions. For example, "safe resource under strong interference from closed CSG" may be used only when a UE served by a macro cell is under severe interference from a femto cell, and "safe resource under strong interference for cell range expansion" may be used by a UE that camps on a weak pico cell. This approach may entail the use of two IEs, but may allow for forward compatibility for the macro-pico case.

Figure 9:
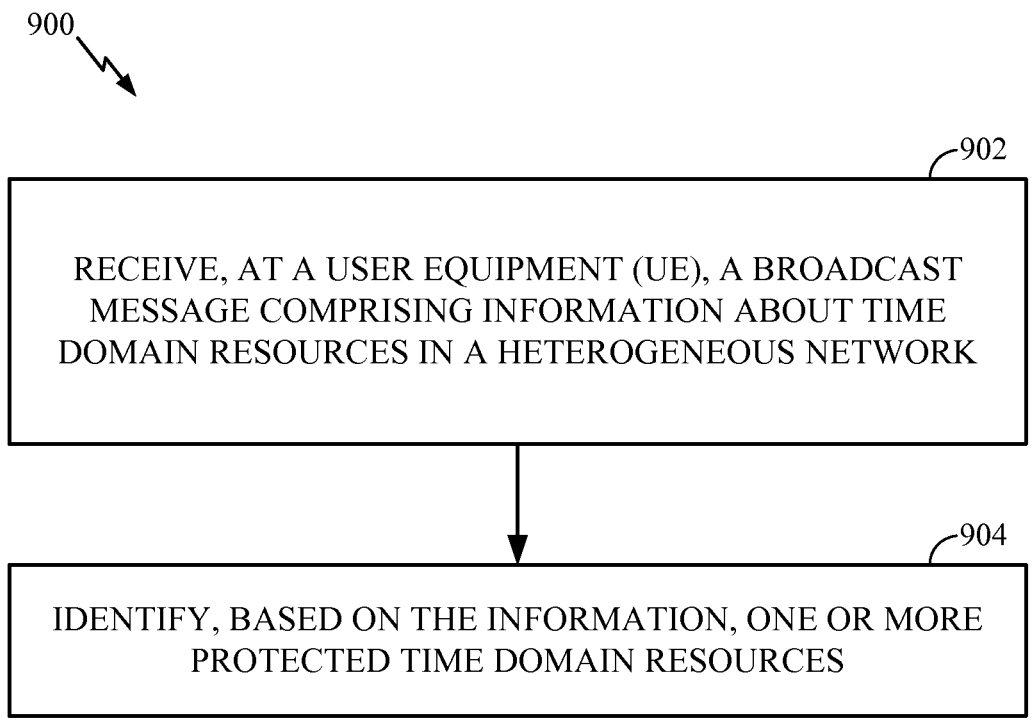
FIG. 9 is a functional block diagram conceptually illustrating example blocks executed to receive broadcast information indicating protected resources in a heterogeneous network in accordance with certain aspects of the present disclosure.

FIG. 9 is a functional block diagram conceptually illustrating example blocks 900 executed to receive broadcast information indicating protected resources in a heterogeneous network, in accordance with certain aspects of the present disclosure. The blocks 900 may be performed, for example, by a UE. At block 902, the UE may receive a broadcast message comprising information about time-domain resources. The time-domain resources were determined based on cooperative partitioning of resources between a serving access point and one or more non-serving access points of a heterogeneous network. At block 904, the UE may identify, based on the information, one or more protected time-domain resources in which use by an interfering access point is limited.

As noted above, the UE may use these protected time-domain resources for idle mode mobility functions, such as cell selection and reselection. As noted above, the protected resources may correspond to a statically negotiated or assigned almost blank subframe (ABSF) of an aggressor access point (e.g., an access point of a cell that is causing strong interference). It may be particularly desirable to use such protected resources when the UE is under severe interference from the aggressor.

Figure 10:
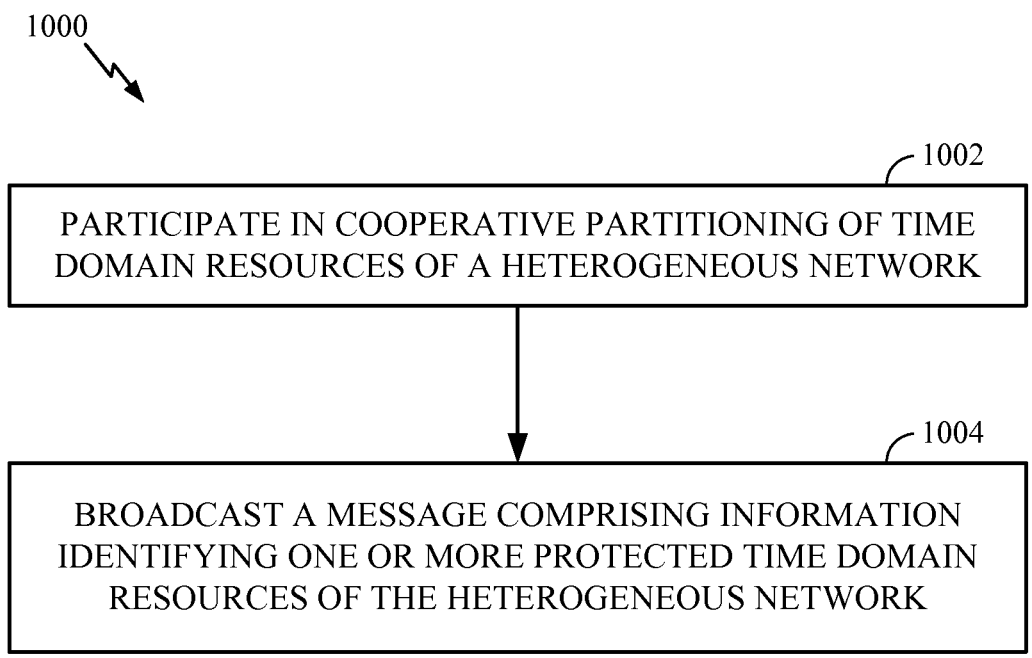
FIG. 10 is a functional block diagram conceptually illustrating example blocks executed to broadcast information indicating protected resources in accordance with certain aspects of the present disclosure.

FIG. 10 is a functional block diagram conceptually illustrating example blocks 1000 executed to broadcast information indicating protected resources, in accordance with certain aspects of the present disclosure. The blocks 1000 may be performed, for example, by an access point (e.g., a macro, femto, or pico eNB) in a heterogeneous network. At block 1002, the access point may participate in cooperative partitioning of time-domain resources of a heterogeneous network. This participation may involve active negotiations between access points or simply receiving resource partitioning information, for example, from another access point. At block 1004, the access point may broadcast a message comprising information identifying one or more protected time-domain resources of the heterogeneous network in which use by an interfering access point is limited.

RRM/RLM Measurements for Enhanced Inter-Cell Interference Coordination

For certain aspects of the present disclosure, a network may signal, using dedicated Radio Resource Control (RRC) signaling, information about which resources a connected mode UE may use for performing Radio Resource Management (RRM) and Radio Link Monitoring (RLM) measurements for enhanced interference coordination. For example, in a macro-femto scenario, non-member UEs may be protected and allowed to access the macro cell. As a further example, in a macro-pico scenario, interference may need to be coordinated so that the pico cell may serve its UEs better, possibly with a moderate handover (HO) bias.

The UE may use any subframes for performing RRM/RLM measurements (e.g., non-MBSFN (non-multimedia broadcast over a single frequency network) subframes). However, for proper operation of eICIC in a heterogeneous network, the UE may use specific resources (e.g., subframes) for measurement for the RRM/RLM. For example, for connected-mode RRM/RLM measurements, the UE may use dedicated RRC signaling for measurement configuration.

For certain aspects, the resource partitioning between base stations may be based on time, as will be described further herein. For example, the resources may be partitioned by subframes (e.g., for E-UTRAN). For other aspects, the resource partitioning between base stations may be based on frequency or a combination of time and frequency. When the network supports enhanced interference coordination using time-domain resource partitioning, the network may signal the information about which resources the connected-mode UE may use for RRM/RLM measurements via dedicated RRC signaling. The statically negotiated or assigned almost blank subframe (ABSF) of the aggressor (i.e., the cell causing a strong interference) may be used by the UE, especially when the UE is under a severe interference from the aggressor. For certain aspects, the ABSF may be an N subframe.

For certain aspects, the restricted measurement resources signaled to the UE may comprise the same set of restricted resources for all cells. The set of restricted resources may be included in a measurement object IE in the RRC message. For other aspects, the restricted measurement resources signaled to the UE may comprise a different set of resources per different cells (e.g., according to cell type, such as macro/femto/pico). For example, a set of resources may be configured for each Physical Cell Identity (PCI). As another example, a set of resources may be configured for a range of PCIs.

For certain aspects, the eNB may configure the restricted measurement resources all the time. For other aspects, the eNB may configure the restricted measurement resources based on the radio condition reported by the UE (e.g., in a heterogeneous network).

Combinations of the above-described embodiments may be used. For example, the restricted measurement resources signaled to the UE may comprise using common resources for all cells, wherein the restricted measurement resources may be based on the radio condition reported by the UE. As another example, the restricted measurement resources signaled to the UE may comprise using different resources per cell type, wherein the restricted measurement resources may be configured by the eNB all the time.

Figure 11:
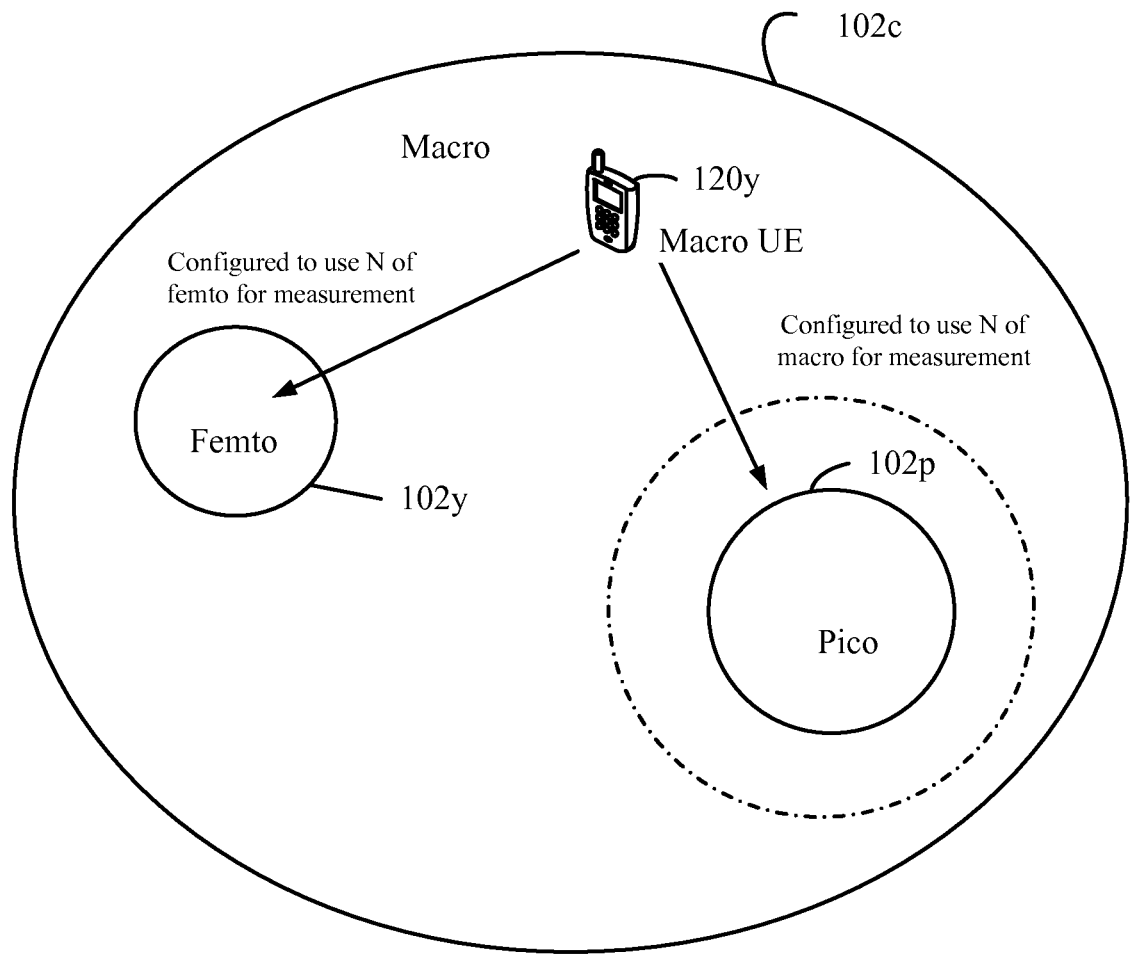
FIG. 11 illustrates restricted measurement resources signaled to a UE associated with a macro cell, using common resources for all cells, in accordance with certain aspects of the present disclosure.

FIG. 11 illustrates restricted measurement resources signaled to a UE 120y, associated with a macro cell 102c, using common resources for all cells. As illustrated in FIG. 11, a pico cell 102p and a femto cell 102y may reside within the coverage area of the macro cell 102c. When the UE 120y is not in close proximity to the femto cell 102y, the UE 120y may be configured to use an N subframe of the macro cell 102c (i.e., $N_{macro}$) to perform RRM/RLM measurements, in an effort to detect the pico cell 102p where $N_{macro}$ correlates to a protected subframe for the pico cell 102p (i.e., $U_{pico}$). However, when the UE 102y enters the femto cell's coverage area (or comes in close proximity), the macro cell 102c may configure a new measurement with restricted resources. Therefore, the UE 120y may be configured to use an N subframe of the femto cell 102y (i.e., $N_{femto}$) to perform RRM/RLM measurements, where $N_{femto}$ may be a different subframe than $N_{macro}$. In other words, the UE 120y may use another set of restricted resources when the UE 120y is not in close proximity to the coverage area of the femto cell 102y.

For certain aspects, measurement resources for RRM and RLM may be configured commonly. This may ensure that the UE may correctly declare a radio link failure (RLF), based on RLM, when the UE cannot perform a proper RRM measurement. For other aspects, measurement resources for RRM and RLM may be configured separately. Furthermore, the eNB may utilize a Channel State Information (CSI) report from the UE (i.e., when the UE reports different CSI values for protected and unprotected resources) to infer whether the UE is under a strong interference or not.

Figure 12:
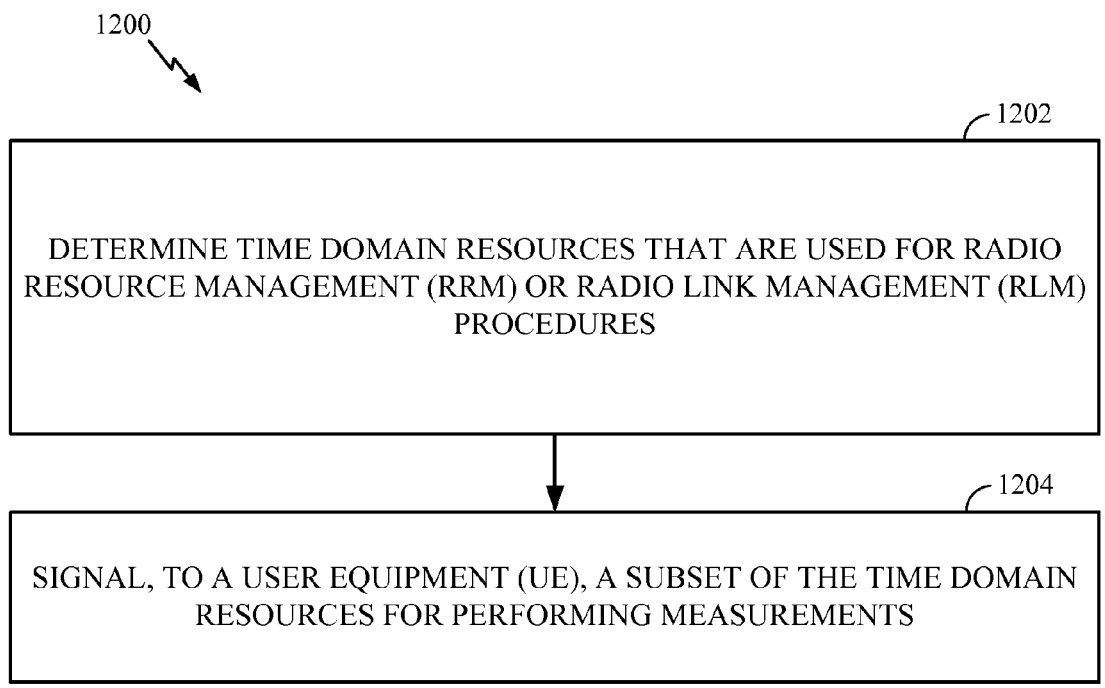
FIG. 12 is a functional block diagram conceptually illustrating example blocks executed to determine and signal a subset of time domain resource assignments for performing certain measurements, in accordance with certain aspects of the present disclosure.

FIG. 12 is a functional block diagram conceptually illustrating example blocks 1200 executed to determine and signal a subset of time domain resource assignments for performing certain measurements, in accordance with certain aspects of the present disclosure. The blocks 1200 may be performed, for example, by a base station or an eNB 110 in signaling, to a UE, resources for performing RRM/RLM measurements for eICIC. At block 1202, the base station may determine time-domain resources that are used for radio resource management (RRM) or radio link management (RLM) procedures. These time-domain resources are determined based on cooperative partitioning of resources between a serving access point and one or more non-serving access points. At block 1204, the base station may signal, to a UE, a subset of the time-domain resources for performing measurements at the UE.

General Resource Partitioning for eICIC

Figure 13:
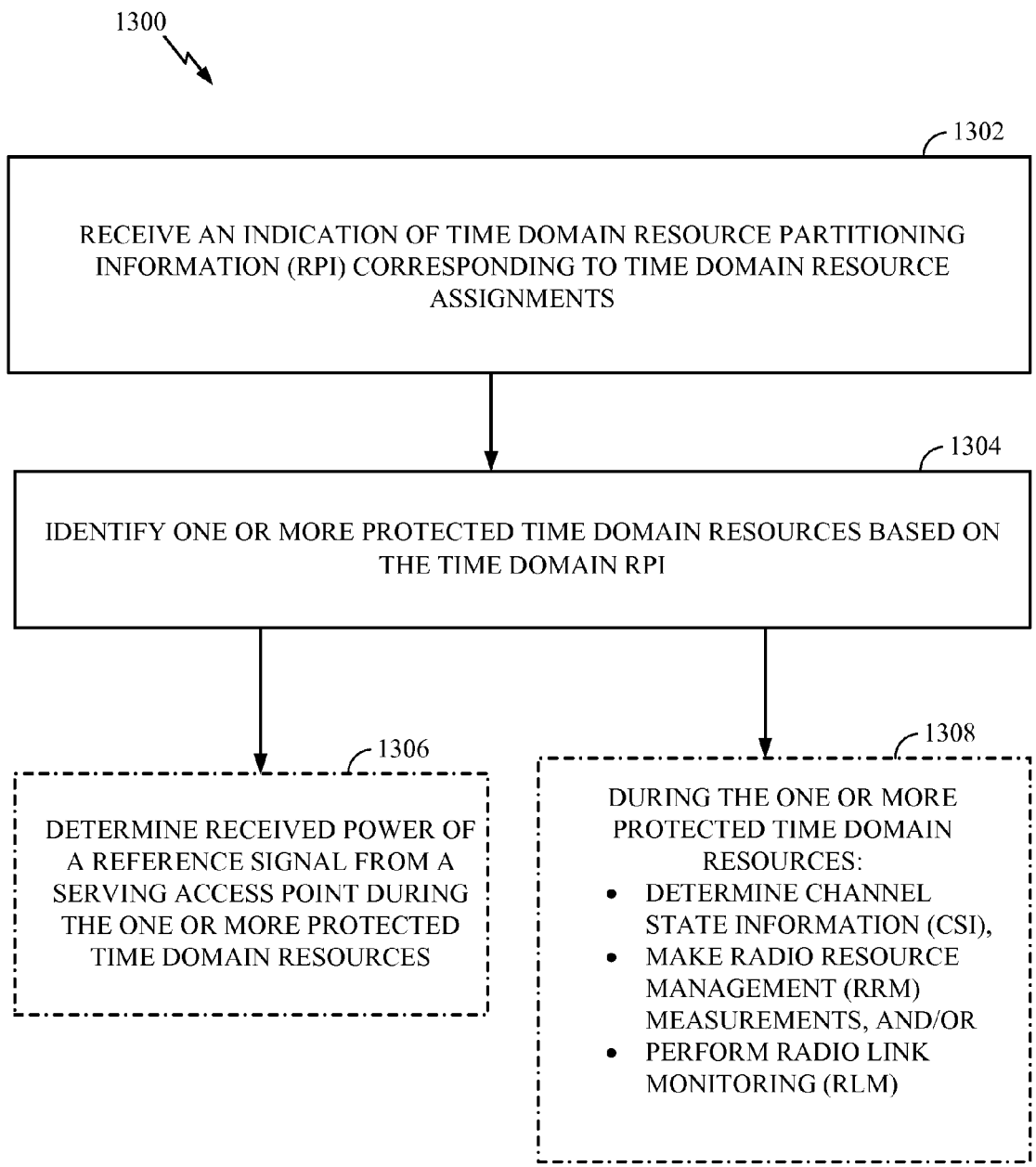
FIG. 13 is a functional block diagram conceptually illustrating example blocks executed to identify protected time domain resources based on received time domain resource partitioning information (RPI), in accordance with certain aspects of the present disclosure.

FIG. 13 is a functional block diagram conceptually illustrating example blocks 1300 executed to identify protected time domain resources based on received time domain resource partitioning information (RPI), in accordance with certain aspects of the present disclosure. The blocks 1300 may be performed, for example, by a UE 120.

At block 1302, the UE may receive an indication of time-domain RPI. The time-domain RPI may correspond to time-domain resource assignments between a serving access point and one or more non-serving access points in a heterogeneous network (HetNet).

At block 1304, the UE may identify one or more protected time-domain resources based on the time-domain RPI. The one or more protected time-domain resources are time-domain resources in which use by an interfering access point is limited.

For certain aspects, the one or more protected time-domain resources may comprise an almost blank subframe (ABS) associated with the interfering access point. The time-domain RPI may comprise a bitmap with one or more bits set to a value indicating the one or more protected time-domain resources for certain aspects. For certain aspects, the one or more protected time domain resources may be common to the serving access point and the one or more non-serving access points.

For certain aspects, the indication of the time-domain RPI may be received from the serving access point. For certain aspects, the interfering access point may be one of the non-serving access points, and the one or more protected time-domain resources may be associated with the serving access point. The interfering access point may be associated with a closed subscriber group (CSG) to which the UE does not belong. For other aspects, the interfering access point may be the serving access point, and the protected time-domain resources may correspond to the non-serving access points.

For certain aspects, the indication of the time domain RPI may be received in a broadcast message. The UE may receive the broadcast message while the UE is in idle mode. The time domain RPI may be broadcast in a system information block (SIB). For certain aspects, the UE may receive a neighbor list from the serving access point. This neighbor list carries the time-domain RPI in the SIB. For certain aspects, the time domain RPI in the broadcast message may be associated with a first access point different from a second access point that transmitted the broadcast message, the first and second access points being in the heterogeneous network. For other aspects, the time domain RPI in the broadcast message may be associated with the same access point that transmitted the broadcast message.

For certain aspects, the UE may receive, from the serving access point, the broadcast message comprising the time-domain RPI corresponding to the serving access point. The UE may identify the protected resources by deriving the one or more protected time-domain resources for the one or more non-serving access points based on the protected time-domain resources for the serving access point. For certain aspects, the deriving may comprise considering the one or more protected time domain resources for the one or more non-serving access points to be the same as the protected time domain resources for the serving access point. For other aspects, the deriving may comprise considering the one or more protected time domain resources for the one or more non-serving access points to be the compliment of the protected time-domain resources for the serving access point.

For certain aspects, the indication of the time-domain RPI may comprise at least one of a dedicated message or a unicast message. The UE may receive the dedicated message or the unicast message while the UE is in connected mode. For certain aspects, the UE may determine received power of a reference signal from the serving access point during the one or more protected time-domain resources.

For certain aspects, the UE may optionally determine, at block 1306, received power of a reference signal (RS) from the serving access point during the one or more protected time-domain resources. For certain aspects, the UE may optionally perform at least one of the following at block 1308: (1) determining channel state information (CSI); (2) making radio resource management (RRM) measurements; or (3) performing radio link monitoring (RLM), based on one or more signals from the serving access point during the one or more protected time-domain resources. For certain aspects, the protected time-domain resources for RRM are the same as the protected time domain resources for RLM. A single information element (IE) may be used to indicate the protected time-domain resources for both RRM and RLM in this case.

For certain aspects, the UE may receive the indication of the time domain RPI by receiving a first IE indicating first protected time domain resources associated with the serving access point and receiving a second IE indicating second protected time domain resources associated with at least one of the non-serving access points. The second IE may comprise a cell identity (ID) for each of the at least one of the non-serving access points. For certain aspects, based on one or more signals from the at least one of the non-serving access points, the UE may determine channel state information (CSI), make radio resource management (RRM) measurements, and/or perform radio link monitoring (RLM), during the second protected time domain resources.

Figure 14:
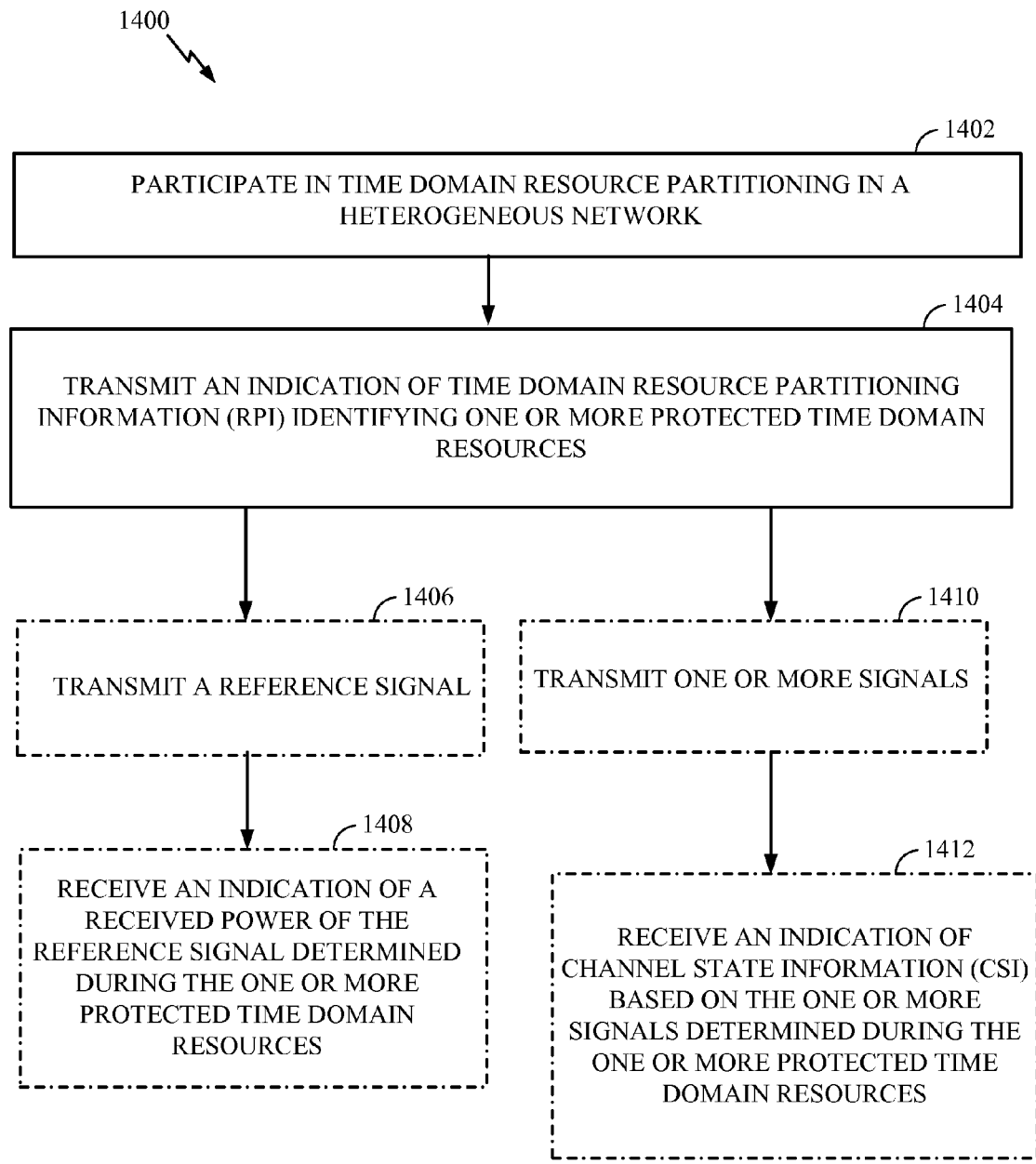
FIG. 14 is a functional block diagram conceptually illustrating example blocks executed to utilize time domain resource partitioning in a heterogeneous network, in accordance with certain aspects of the present disclosure.

FIG. 14 is a functional block diagram conceptually illustrating example blocks 1400 executed to utilize time-domain resource partitioning in a HetNet, in accordance with certain aspects of the present disclosure. The blocks 1400 may be performed, for example, by a base station or an eNB 110.

At block 1402, the base station may participate in time-domain resource partitioning in a HetNet. At block 1404, the base station may transmit an indication of time-domain RPI identifying one or more protected time-domain resources.

The one or more protected time-domain resources are time-domain resources in which use by an interfering access point is limited.

For certain aspects, the one or more protected time domain resources may comprise an almost blank subframe (ABS) associated with the interfering access point. The time domain RPI may comprise a bitmap with one or more bits set to a value indicating the one or more protected time domain resources. For certain aspects, the time domain resources may be commonly partitioned for a serving access point and one or more non-serving access points in the heterogeneous network.

For certain aspects, the base station may transmit the indication by broadcasting the indication of the time domain RPI. The time domain RPI may be broadcast in a system information block (SIB), such as in one or more information elements (IEs) of the SIB, or in a master information block (MIB). For certain aspects, the indication of the time domain RPI may be broadcast from an access point associated with the one or more protected time domain resources. For other aspects, the indication of the time domain RPI may be broadcast from a first access point, and the one or more protected time domain resources may be associated with a second access point different from the first access point.

For certain aspects, the base station may transmit the indication using a dedicated message or a unicast message. The indication of the time domain RPI may be transmitted to a user equipment (UE) operating in a connected mode.

For certain aspects, the base station may optionally transmit a reference signal (RS) at 1406 to a UE. At 1408, the base station may receive, from the UE, an indication of a received power of the reference signal determined during the one or more protected time-domain resources.

For certain aspects, the base station may optionally transmit one or more signals to a UE at 1410. At 1412, the base station may receive, from the UE, an indication of CSI based on the one or more signals determined during the one or more protected time-domain resources.

The protected time domain resources may be used by the UE for radio resource management (RRM) or radio link management (RLM) procedures. For certain aspects, protected time domain resources for RRM may be the same as the protected time domain resources for RLM.

For certain aspects, the base station may optionally receive a report from the UE indicating radio conditions. The base station may determine, based on the report and the time domain resource partitioning, the one or more protected time domain resources identified by the time domain RPI. The radio conditions may comprise information relating to a proximity of the UE to one or more non-serving access points. The protected time domain resources may comprise time domain resources partitioned for the one or more non-serving access points or for a serving access point.

For certain aspects, the base station may transmit the indication by transmitting a first IE indicating first protected time domain resources associated with a first access point in the heterogeneous network and transmitting a second IE indicating second protected time domain resources associated with one or more second access points different from the first access point. The first access point or the second access point may be the base station that transmitted the indication of the time domain RPI.

For certain aspects, the protected time domain resources may be dependent on a physical cell identity (PCI) of an access point being measured. The protected time domain resources may be configured for a range or a set of PCIs. The range or the set of PCIs may correspond to a power class of access points or to access permissions of access points.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for transmitting or means for sending may comprise a transmitter, a modulator 354, and/or an antenna 352 of the UE 120 depicted in FIG. 3 or a transmitter, a modulator 332, and/or an antenna 334 of the eNB 110 shown in FIG. 3. Means for receiving may comprise a receiver, a demodulator 354, and/or an antenna 352 of the UE 120 depicted in FIG. 3 or a receiver, a demodulator 332, and/or an antenna 334 of the eNB 110 shown in FIG. 3. Means for processing, means for determining, means for identifying, means for making, means for performing, and/or means for participating may comprise a processing system, which may include at least one processor, such as the transmit processor 320, the receive processor 338, or the controller/processor 340 of the eNB 110 or the receive processor 358, the transmit processor 364, or the controller/processor 380 of the UE 120 illustrated in FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary aspects, the functions described may be implemented in hardware, software, firmware, or any combination thereof. If implemented in software, the functions may be stored on or encoded as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
receiving, at a user equipment (UE), an indication of time domain resource partitioning information (RPI) corresponding to subframe assignments between a serving access point and one or more non-serving access points in a heterogeneous network, wherein the indication of the time domain RPI comprises:
a first information element (IE) indicating first protected subframes associated with the serving access point,
a second IE indicating second protected subframes associated with at least one of the non-serving access points, or
a combination thereof; and
identifying one or more protected subframes based on the time domain RPI, the one or more protected subframes being subframes in which use by an interfering access point is limited.

2. The method of claim 1, wherein the one or more protected subframes comprise an almost blank subframe (ABS) associated with the interfering access point.

3. The method of claim 1, wherein the time domain RPI comprises a bitmap with one or more bits set to a value indicating the one or more protected subframes.

4. The method of claim 1, wherein the indication of the time domain RPI is received from the serving access point.

5. The method of claim 1, wherein the interfering access point is one of the non-serving access points and wherein the one or more protected subframes are associated with the serving access point.

6. The method of claim 5, wherein the interfering access point is associated with a closed subscriber group (CSG) to which the UE does not belong.

7. The method of claim 1, wherein the indication of the time domain RPI is received in a broadcast message.

8. The method of claim 7, wherein the time domain RPI in the broadcast message is associated with a first access point different from a second access point that transmitted the broadcast message, the first and second access points being in the heterogeneous network.

9. The method of claim 7, wherein the time domain RPI is broadcast in a system information block (SIB).

10. The method of claim 9, further comprising receiving a neighbor list from the serving access point, wherein the neighbor list carries the time domain RPI in the SIB.

11. The method of claim 7, wherein the receiving comprises receiving, from the serving access point, the broadcast message comprising the time domain RPI corresponding to the serving access point and wherein the identifying comprises deriving the one or more protected subframes for the one or more non-serving access points based on the protected subframes for the serving access point.

12. The method of claim 11, wherein the deriving comprises considering the one or more protected subframes for the one or more non-serving access points to be the same as the protected subframes for the serving access point.

13. The method of claim 7, wherein the receiving comprises receiving, from the one or more non-serving access points, the broadcast message comprising the time domain RPI about the one or more protected subframes for the one or more non-serving access points.

14. The method of claim 13, wherein the broadcast message comprises a system information block type 1 (SIB1) from the one or more non-serving access points.

15. The method of claim 7, wherein the time domain RPI is broadcast in a master information block (MIB).

16. The method of claim 7, wherein the receiving comprises receiving the broadcast message while the UE is in idle mode.

17. The method of claim 1, wherein the indication of the time domain RPI comprises at least one of a dedicated message or a unicast message.

18. The method of claim 17, wherein the receiving comprises receiving the at least one of the dedicated message or the unicast message while the UE is in connected mode.

19. The method of claim 17, further comprising determining, at the UE, received power of a reference signal from the serving access point during the one or more protected subframes.

20. The method of claim 17, further comprising at least one of determining channel state information (CSI), making radio resource management (RRM) measurements, or performing radio link monitoring (RLM), at the UE, based on one or more signals from the serving access point during the one or more protected subframes.

21. The method of claim 20, wherein the one or more protected time domain resources for RRM are the same as the protected subframes for RLM.

22. The method of claim 21, wherein a single information element (IE) is used to indicate the protected subframes for both RRM and RLM.

23. The method of claim 1, wherein the second IE comprises a cell identity (ID) for each of the at least one of the non-serving access points.

24. The method of claim 1, further comprising at least one of determining channel state information (CSI), making radio resource management (RRM) measurements, or performing radio link monitoring (RLM), at the UE, based on one or more signals from the at least one of the non-serving access points during the second protected subframes.

25. The method of claim 1, wherein the one or more protected subframes are common to the serving access point and the one or more non-serving access points.

26. The method of claim 2, wherein the ABS is limited to carrying a required transmission.

27. The method of claim 2, wherein the ABS is limited to carrying one or more of reference signals (RS), synchronization signals, or control signals.

28. An apparatus for wireless communications, comprising:
    a receiver configured to receive an indication of time domain resource partitioning information (RPI) corresponding to subframe assignments between a serving access point and one or more non-serving access points in a heterogeneous network, wherein the indication of the time domain RPI comprises:
        a first information element (IE) indicating first protected subframes associated with the serving access point,
        a second IE indicating second protected subframes associated with at least one of the non-serving access points, or
        a combination thereof; and
    at least one processor configured to identify one or more protected subframes based on the time domain RPI, the one or more protected subframes being subframes in which use by an interfering access point is limited.

29. The apparatus of claim 28, wherein the one or more protected subframes comprise an almost blank subframe (ABS) associated with the interfering access point.

30. The apparatus of claim 28, wherein the time domain RPI comprises a bitmap with one or more bits set to a value indicating the one or more protected subframes.

31. The apparatus of claim 28, wherein the indication of the time domain RPI is received from the serving access point.

32. The apparatus of claim 28, wherein the interfering access point is one of the non-serving access points and wherein the one or more protected subframes are associated with the serving access point.

33. The apparatus of claim 32, wherein the interfering access point is associated with a closed subscriber group (CSG) to which the apparatus does not belong.

34. The apparatus of claim 28, wherein the indication of the time domain RPI is received in a broadcast message.

35. The apparatus of claim 34, wherein the time domain RPI in the broadcast message is associated with a first access point different from a second access point that transmitted the broadcast message, the first and second access points being in the heterogeneous network.

36. The apparatus of claim 34, wherein the time domain RPI is broadcast in a system information block (SIB).

37. The apparatus of claim 36, wherein the receiver is configured to receive a neighbor list from the serving access point, wherein the neighbor list carries the time domain RPI in the SIB.

38. The apparatus of claim 34, wherein the receiver is configured to receive, from the serving access point, the broadcast message comprising the time domain RPI corresponding to the serving access point and wherein the at least one processor is configured to identify the one or more protected subframes by deriving the one or more protected subframes for the one or more non-serving access points based on the protected subframes for the serving access point.

39. The apparatus of claim 38, wherein the deriving comprises considering the one or more protected subframes for the one or more non-serving access points to be the same as the protected subframes for the serving access point.

40. The apparatus of claim 34, wherein the receiver is configured to receive, from the one or more non-serving access points, the broadcast message comprising the time domain RPI about the one or more protected subframes for the one or more non-serving access points.

41. The apparatus of claim 40, wherein the broadcast message comprises a system information block type 1 (SIB1) from the one or more non-serving access points.

42. The apparatus of claim 34, wherein the time domain RPI is broadcast in a master information block (MIB).

43. The apparatus of claim 34, wherein the receiver is configured to receive the broadcast message while the apparatus is in idle mode.

44. The apparatus of claim 28, wherein the indication of the time domain RPI comprises at least one of a dedicated message or a unicast message.

45. The apparatus of claim 44, wherein the receiver is configured to receive the at least one of the dedicated message or the unicast message while the apparatus is in connected mode.

46. The apparatus of claim 44, wherein the at least one processor is configured to determine received power of a reference signal from the serving access point during the one or more protected subframes.

47. The apparatus of claim 44, wherein the at least one processor is configured to at least one of determine channel state information (CSI), make radio resource management (RRM) measurements, or perform radio link monitoring (RLM) based on one or more signals from the serving access point during the one or more protected subframes.

48. The apparatus of claim 47, wherein the one or more protected subframes for RRM are the same as the protected subframes for RLM.

49. The apparatus of claim 48, wherein a single information element (IE) is used to indicate the protected subframes for both RRM and RLM.

50. The apparatus of claim 28, wherein the second IE comprises a cell identity (ID) for each of the at least one of the non-serving access points.

51. The apparatus of claim 28, wherein the at least one processor is configured to at least one of determine channel state information (CSI), make radio resource management (RRM) measurements, or perform radio link monitoring (RLM) based on one or more signals from the at least one of the non-serving access points during the second protected subframes.

52. The apparatus of claim 28, wherein the one or more protected subframes are common to the serving access point and the one or more non-serving access points.

53. The apparatus of claim 29, wherein the ABS is limited to carrying a required transmission.

54. The apparatus of claim 29, wherein the ABS is limited to carrying one or more of reference signals (RS), synchronization signals, or control signals.

55. An apparatus for wireless communications, comprising:
   means for receiving an indication of time domain resource partitioning information (RPI) corresponding to subframe assignments between a serving access point and one or more non-serving access points in a heterogeneous network, wherein the indication of the time domain RPI comprises:
      a first information element (IE) indicating first protected subframes associated with the serving access point,
      a second IE indicating second protected subframes associated with at least one of the non-serving access points, or
      a combination thereof; and
   means for identifying one or more protected subframes based on the time domain RPI, the one or more protected subframes being subframes in which use by an interfering access point is limited.

56. The apparatus of claim 55, wherein the one or more protected subframes comprise an almost blank subframe (ABS) associated with the interfering access point.

57. The apparatus of claim 55, wherein the time domain RPI comprises a bitmap with one or more bits set to a value indicating the one or more protected subframes.

58. The apparatus of claim 55, wherein the indication of the time domain RPI is received from the serving access point.

59. The apparatus of claim 55, wherein the interfering access point is one of the non-serving access points and wherein the one or more protected subframes are associated with the serving access point.

60. The apparatus of claim 55, wherein the indication of the time domain RPI is received in a broadcast message.

61. The apparatus of claim 55, wherein the indication of the time domain RPI comprises at least one of a dedicated message or a unicast message.

62. The apparatus of claim 55, wherein the one or more protected subframes are common to the serving access point and the one or more non-serving access points.

63. The apparatus of claim 56, wherein the ABS is limited to carrying a required transmission.

64. The apparatus of claim 56, wherein the ABS is limited to carrying one or more of reference signals (RS), synchronization signals, or control signals.

65. A non-transitory computer-readable medium having code for:
   receiving, at a user equipment (UE), an indication of time domain resource partitioning information (RPI) corresponding to subframe assignments between a serving access point and one or more non-serving access points in a heterogeneous network, wherein the indication of the time domain RPI comprises:
      a first information element (IE) indicating first protected subframes associated with the serving access point,
      a second IE indicating second protected subframes associated with at least one of the non-serving access points, or
      a combination thereof; and
   identifying one or more protected subframes based on the time domain RPI, the one or more protected subframes being time subframes in which use by an interfering access point is limited.

66. The computer-readable medium of claim 65, wherein the one or more protected subframes comprise an almost blank subframe (ABS) associated with the interfering access point.

67. The computer-readable medium of claim 65, wherein the time domain RPI comprises a bitmap with one or more bits set to a value indicating the one or more protected subframes.

68. The computer-readable medium of claim 65, wherein the indication of the time domain RPI is received from the serving access point.

69. The computer-readable medium of claim 65, wherein the interfering access point is one of the non-serving access points and wherein the one or more protected subframes are associated with the serving access point.

70. The computer-readable medium of claim 65, wherein the indication of the time domain RPI is received in a broadcast message.

71. The computer-readable medium of claim 65, wherein the indication of the time domain RPI comprises at least one of a dedicated message or a unicast message.

72. The computer-readable medium of claim 65, wherein the one or more protected subframes are common to the serving access point and the one or more non-serving access points.

73. The computer-readable medium of claim 66, wherein the ABS is limited to carrying a required transmission.

74. The computer-readable medium of claim 66, wherein the ABS is limited to carrying one or more of reference signals (RS), synchronization signals, or control signals.

* * * * *